United States Patent
You et al.

(10) Patent No.: US 12,279,280 B2
(45) Date of Patent: Apr. 15, 2025

(54) METHOD FOR CONFIGURING RESOURCE AVAILABILITY FOR CHILD NODE OF IAB NODE

(71) Applicant: LG ELECTRONICS INC., Seoul (KR)

(72) Inventors: Hyangsun You, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/768,604

(22) PCT Filed: Oct. 26, 2020

(86) PCT No.: PCT/KR2020/014657
§ 371 (c)(1),
(2) Date: Apr. 13, 2022

(87) PCT Pub. No.: WO2021/080398
PCT Pub. Date: Apr. 29, 2021

(65) Prior Publication Data
US 2024/0298333 A1 Sep. 5, 2024

(30) Foreign Application Priority Data
Oct. 24, 2019 (KR) .................. 10-2019-0133094

(51) Int. Cl.
*H04W 72/231* (2023.01)
*H04W 72/0446* (2023.01)
(Continued)

(52) U.S. Cl.
CPC ..... *H04W 72/231* (2023.01); *H04W 72/0446* (2013.01); *H04W 76/28* (2018.02); *H04W 88/08* (2013.01)

(58) Field of Classification Search
None
See application file for complete search history.

(56) References Cited

U.S. PATENT DOCUMENTS

2019/0313433 A1  10/2019  Abedini et al.
2021/0212070 A1* 7/2021  Luo .................... H04W 72/1263
(Continued)

FOREIGN PATENT DOCUMENTS

WO    2019194737    10/2019

OTHER PUBLICATIONS

NTT Docomo, Inc., Mechanisms for resource multiplexing among backhaul and access links, R1-1911166, 3GPP TSG RAN WG1 Meeting #98b, Chongqing, China, Oct. 4, 2019, see sections 2-2.4; and figures 1 and 5-6.
(Continued)

*Primary Examiner* — Lonnie V Sweet
(74) *Attorney, Agent, or Firm* — BRYAN CAVE LEIGHTON PAISNER LLP

(57) ABSTRACT

Disclosed are a method and a device for configuring resource availability for an IAB node, in which, on the basis of first availability information commonly applied to a plurality of child nodes and second availability information applied to a specific child node, availability of a specific resource for the specific child node is configured to be an unavailable resource.

15 Claims, 38 Drawing Sheets

(51) Int. Cl.
  *H04W 76/28*   (2018.01)
  *H04W 88/08*   (2009.01)

(56) References Cited

U.S. PATENT DOCUMENTS

| | | | |
|---|---|---|---|
| 2021/0273836 A1* | 9/2021 | Luo | H04W 76/27 |
| 2021/0321397 A1* | 10/2021 | Abedini | H04W 16/14 |
| 2021/0410058 A1* | 12/2021 | Dey | H04W 76/10 |
| 2022/0124706 A1* | 4/2022 | Abedini | H04W 72/27 |
| 2022/0217772 A1* | 7/2022 | Harada | H04W 76/15 |
| 2022/0338192 A1* | 10/2022 | Kurita | H04B 7/15528 |
| 2023/0309154 A1* | 9/2023 | Kurita | H04L 5/0094 |
| 2024/0114496 A1* | 4/2024 | Huang | H04B 7/15542 |

OTHER PUBLICATIONS

Intel Corporation, Mechanisms for Resource Multiplexing among Backhaul and Access links, R1-1910646, 3GPP TSG RAN WG1 Meeting #98b, Chongqing, China, Oct. 5, 2019, see section 3; and figures 1-2.

Qualcomm Incorporated, Further topics on IAB resource management, R1-1911102, 3GPP TSG RAN WG1 Meeting #98b, Chongqing, China, Oct. 5, 2019, see pp. 1-5; and figures 1-2.

* cited by examiner

METHOD FOR CONFIGURING RESOURCE AVAILABILITY FOR CHILD NODE OF IAB NODE

This application is the National Stage filing under 35 U.S.C. 371 of International Application No. PCT/KR2020/014657 filed on Oct. 26, 2020, which claims priority to Korean Patent Application No. 10-2019-0133094 filed on Oct. 24, 2019, the contents of which are all hereby incorporated by reference herein in their entirety.

BACKGROUND OF THE DISCLOSURE

Field of the Disclosure

The present disclosure relates to wireless communication.

Related Art

One of the potential technologies aimed at enabling future cellular network deployment scenarios and applications is support for wireless backhaul and relay links, which allows flexible and very dense deployment of NR cells without the need to proportionally densify a transport network.

Since it is expected that a wider bandwidth will be available in NR than in LET along with native deployment of massive MIMO or multi-beam systems (e.g., mmWave spectrum), occasions for development and deployment of integrated access and backhaul links are created. This allows easier deployment of a dense network of self-backhauled NR cells in a more integrated manner by establishing multiple control and data channels/procedures defined to provide access to terminals. Such a system is referred to as integrated access and backhaul links (IAB).

In the next-generation IAB system, a method for setting availability of child link-specific resources is required for more efficient communication in addition to the aforementioned method in consideration of more complicated IAB system environments such as a case in which a plurality of parent IAB nodes are connected to one child IAB node, a case in which there is a plurality of child IAB nodes connected to an IAB node DU, and a case in which SDM/FDM operation between IAB nodes can be performed.

SUMMARY

The present disclosure provides a method for setting availability of resources for a specific child node of IAB nodes.

Advantageous Effects

According to the present disclosure, communication efficiency increases because it is possible to set availability of different resources for a plurality of child nodes connected to an IAB node.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DESCRIPTION OF EXEMPLARY
EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
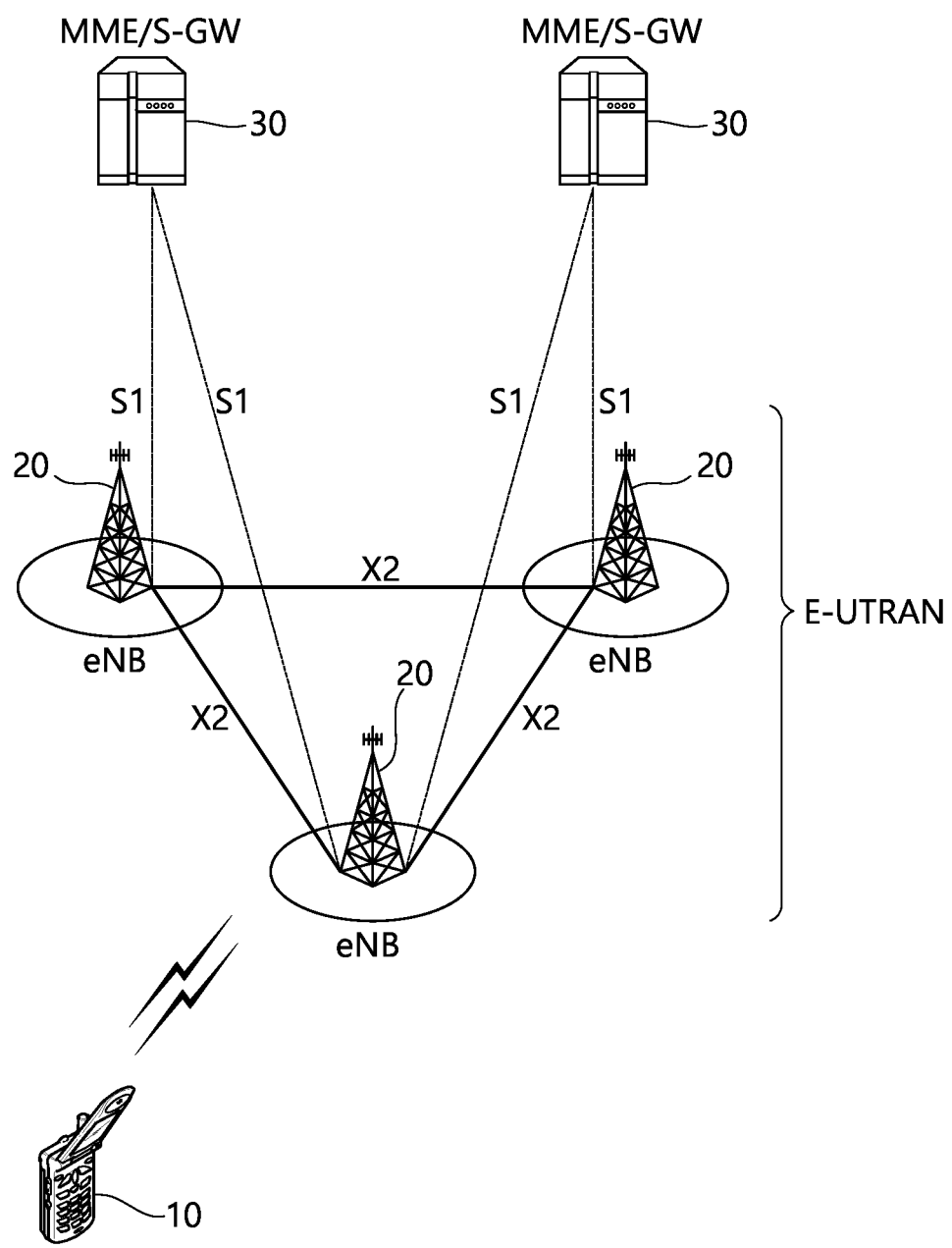
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
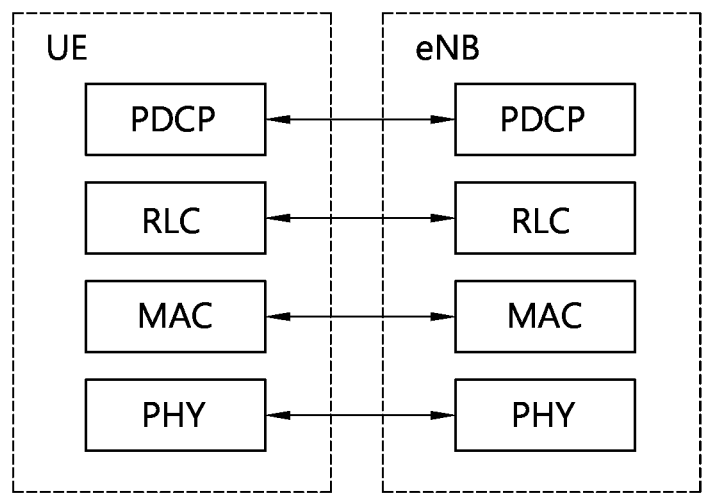
FIG. 2 is a diagram showing a wireless protocol architecture for a user plane.
Figure 3:
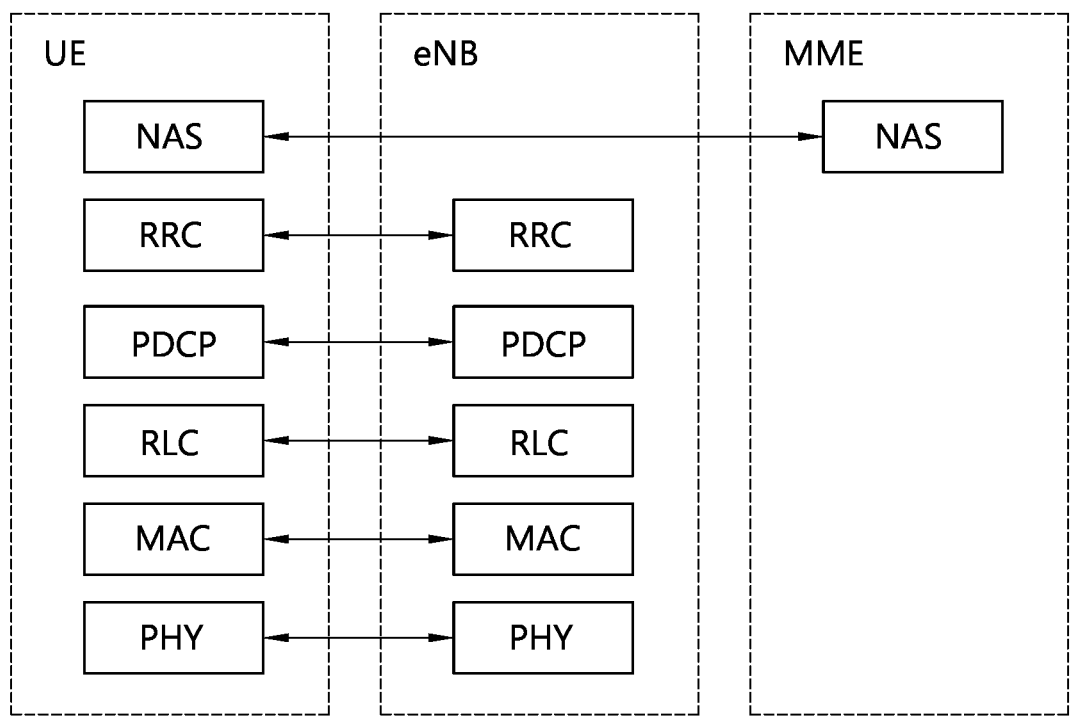
FIG. 3 is a diagram showing a wireless protocol architecture for a control plane. The user plane is a protocol stack for user data transmission.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (Qos) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
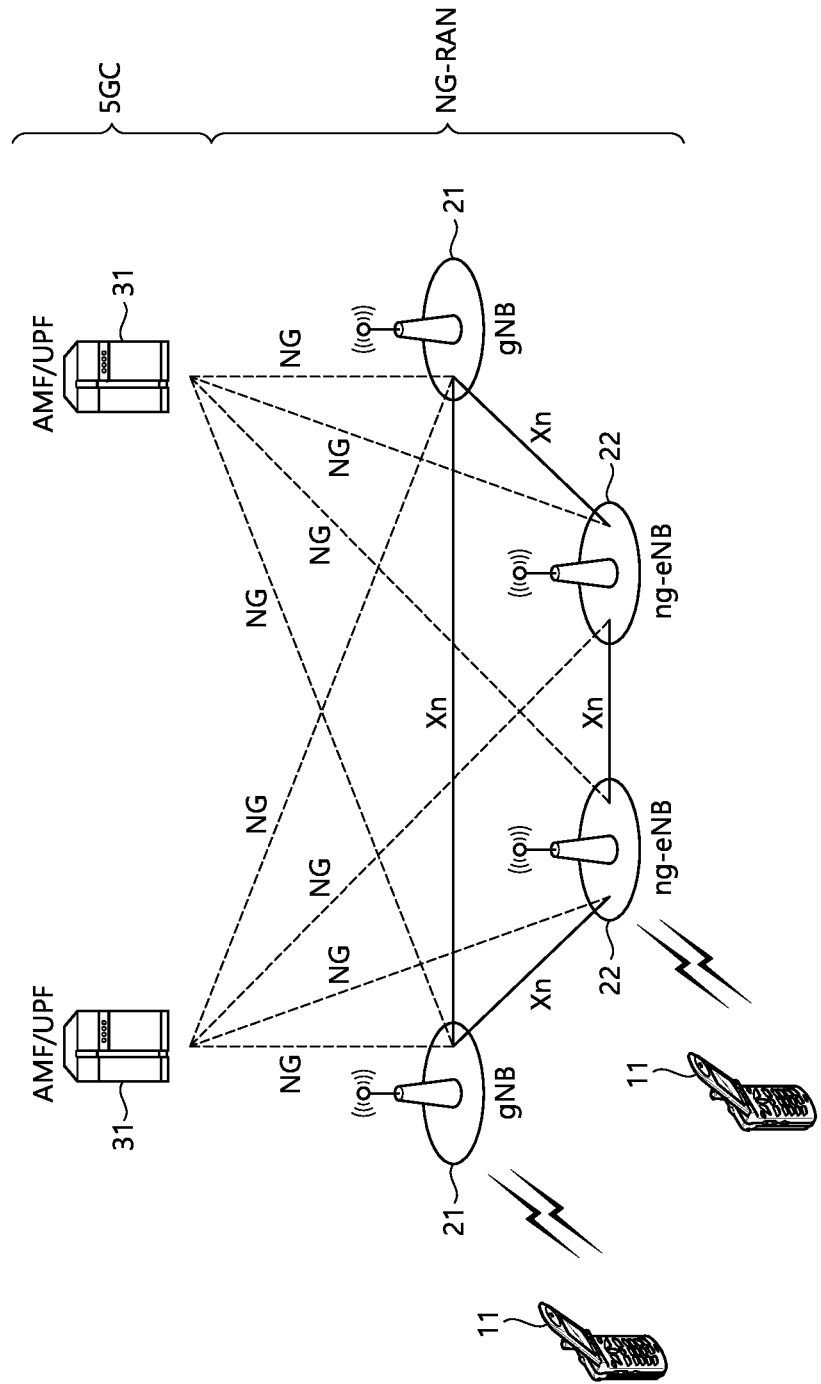
FIG. 4 shows another example of a wireless communication system to which a technical feature of the present disclosure can be applied.

FIG. 4 shows another example of a wireless communication system to which a technical feature of the present disclosure can be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a $5^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
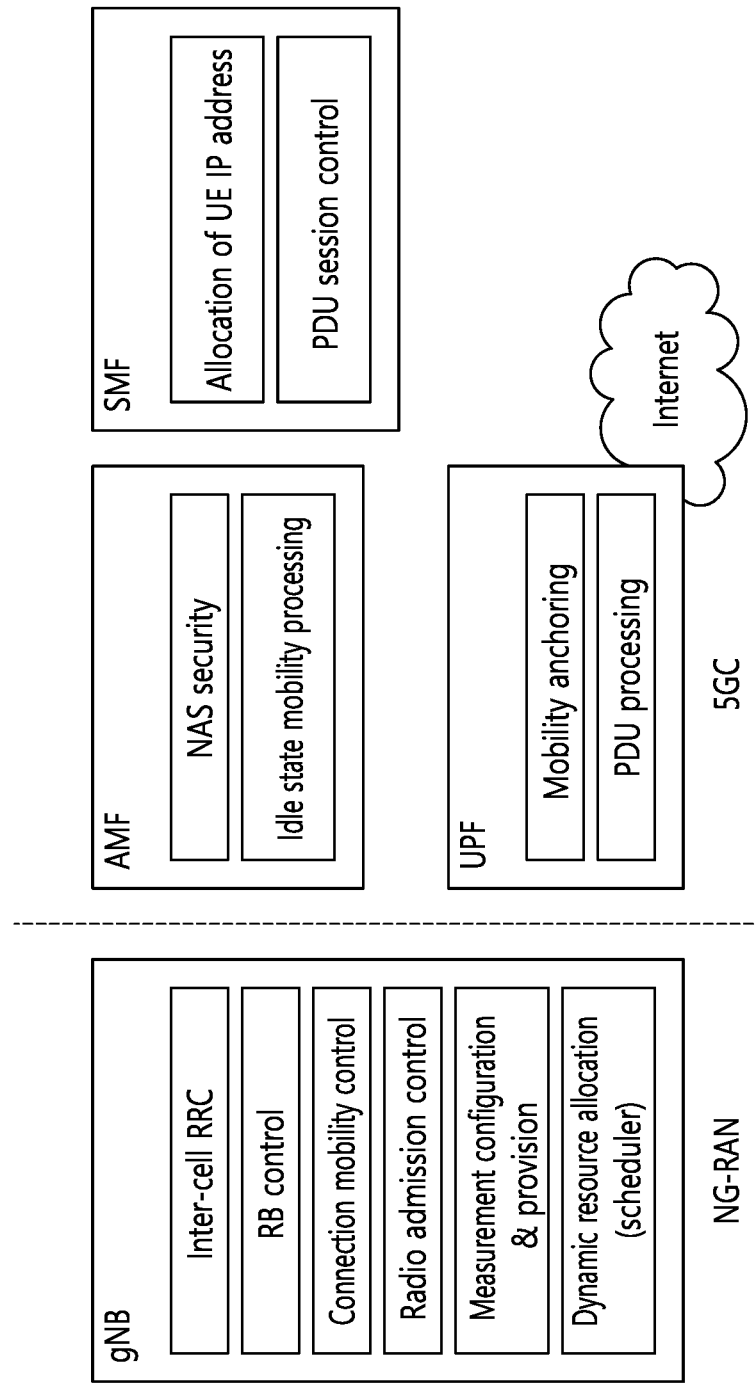
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
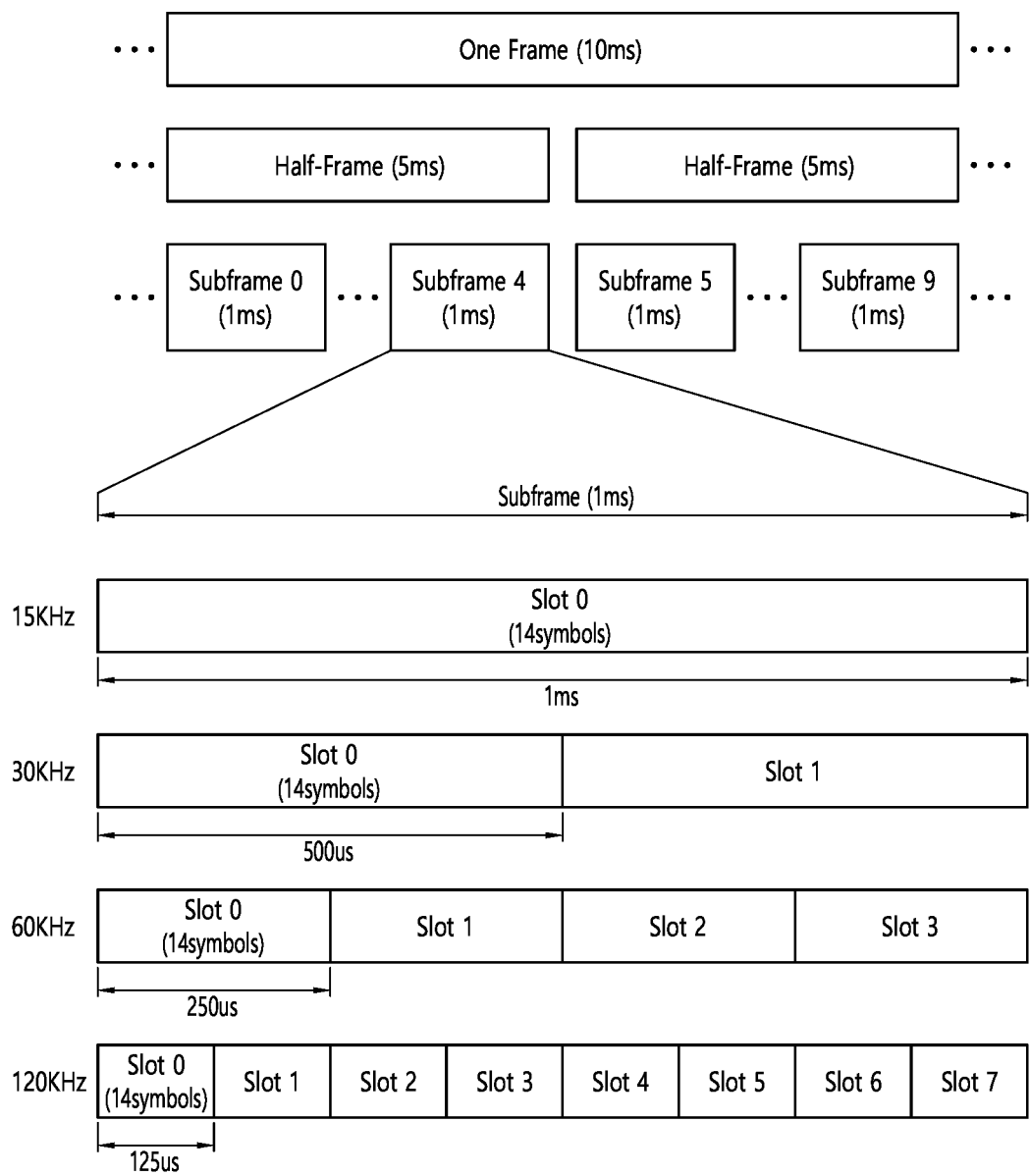
FIG. 6 illustrates a frame structure applicable in NR.

FIG. 6 illustrates a frame structure applicable in NR.

Referring to FIG. 6, a frame may be configured to have a length of 10 millisecond (ms), and may include 10 subframes each having a length of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in the SF according to a subcarrier spacing.

The following table 1 illustrates a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS(15*2^ μ) | $N^{slot}_{symb}$ | $N^{frame,u}_{slot}$ | $N^{subframe,u}_{slot}$ |
|---|---|---|---|
| 60 KHz (μ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
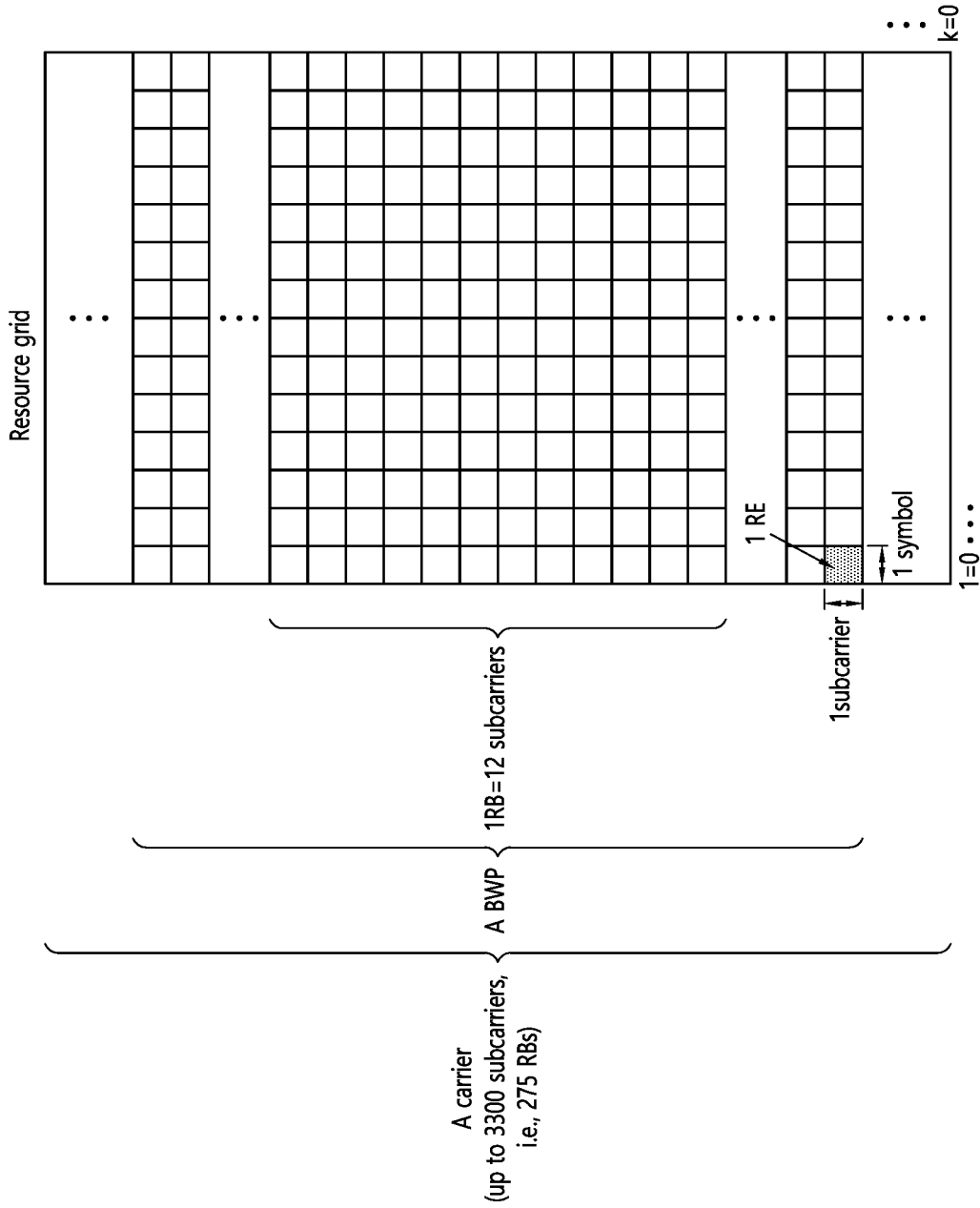
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Figure 8:
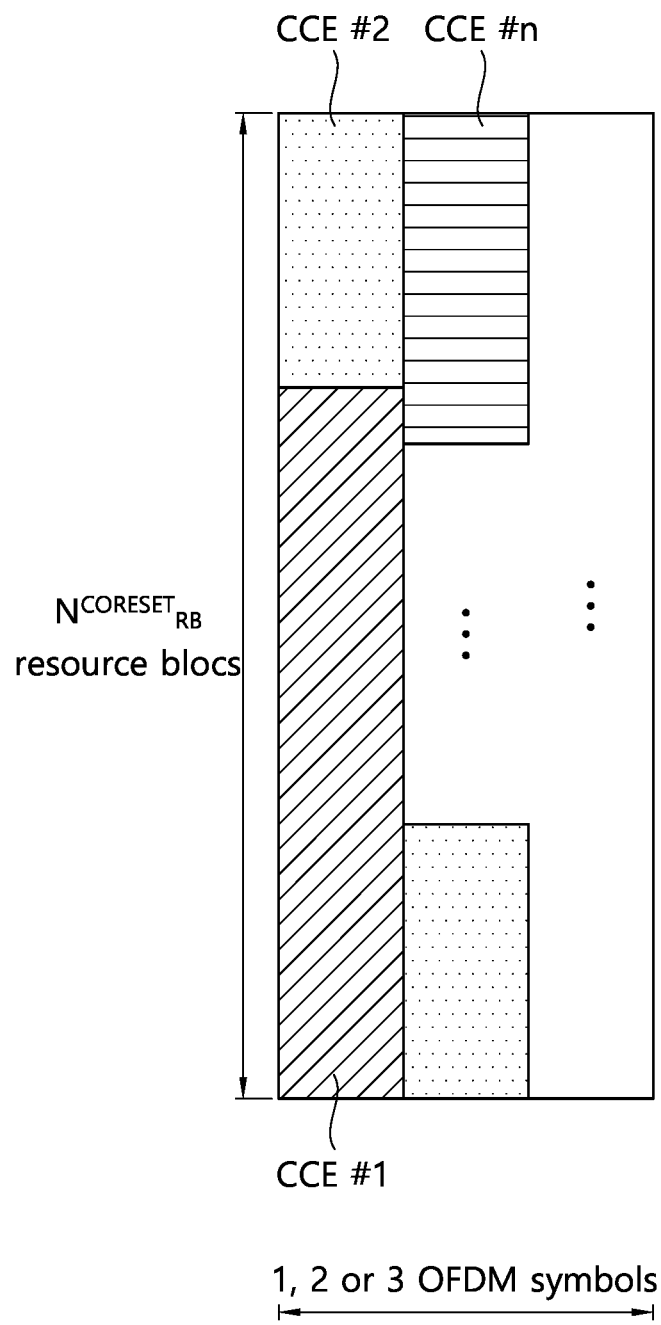
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
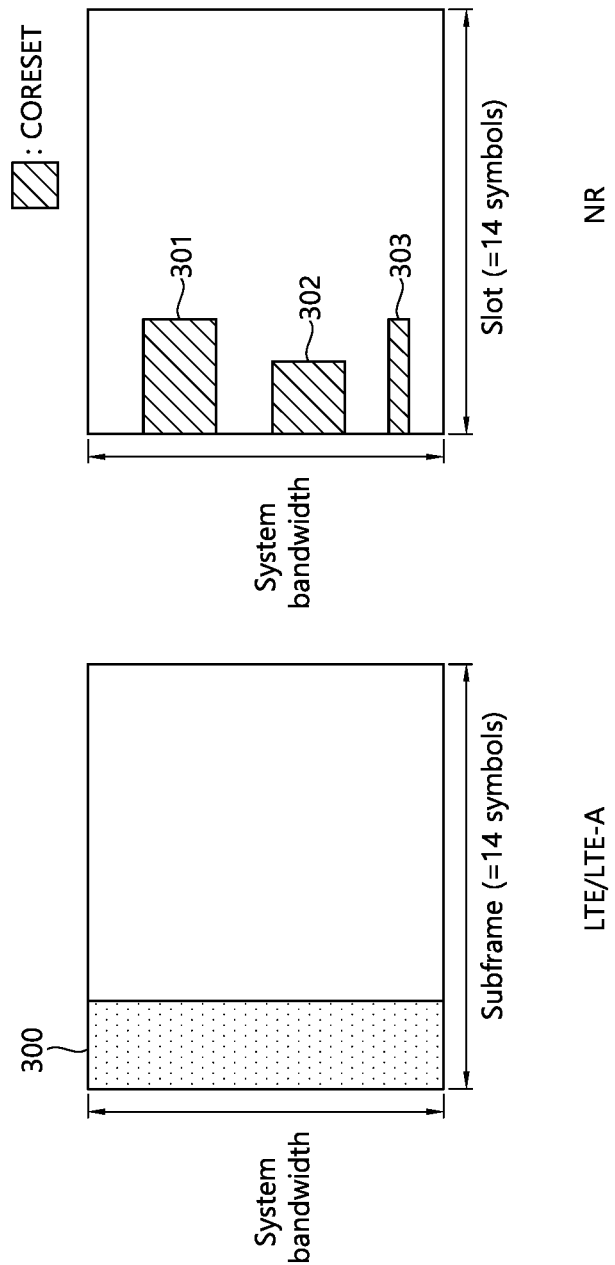
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.
<Self-Contained Subframe Structure>

Figure 10:
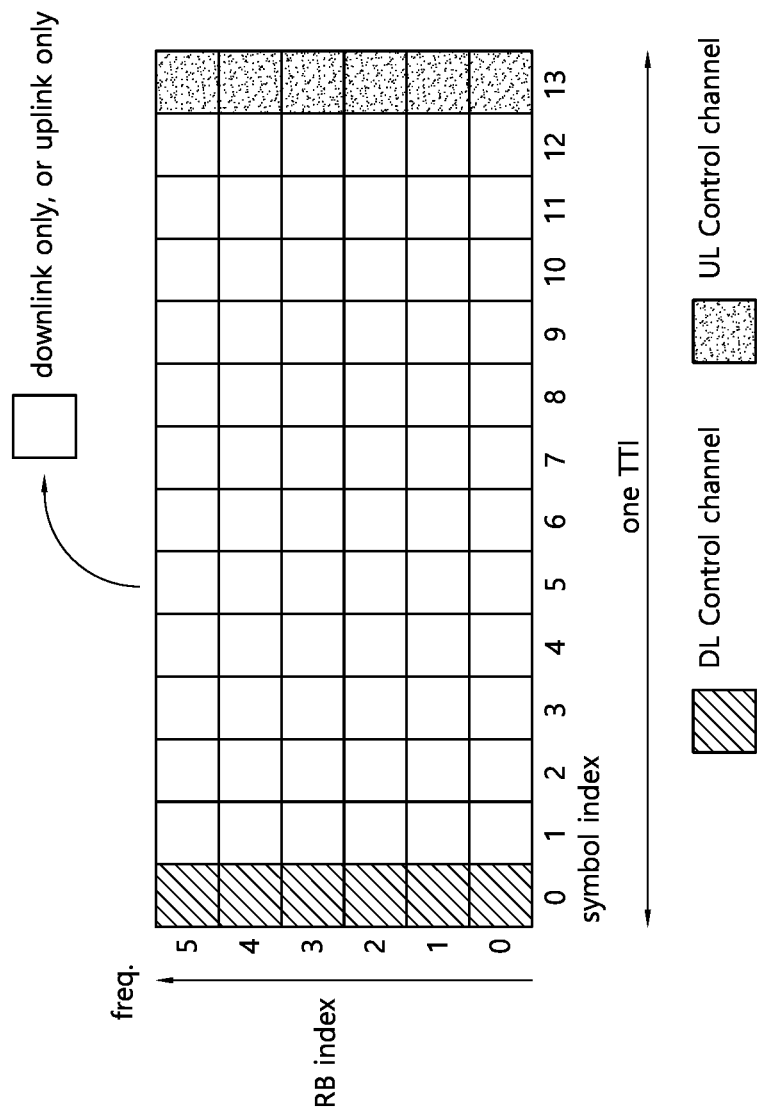
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
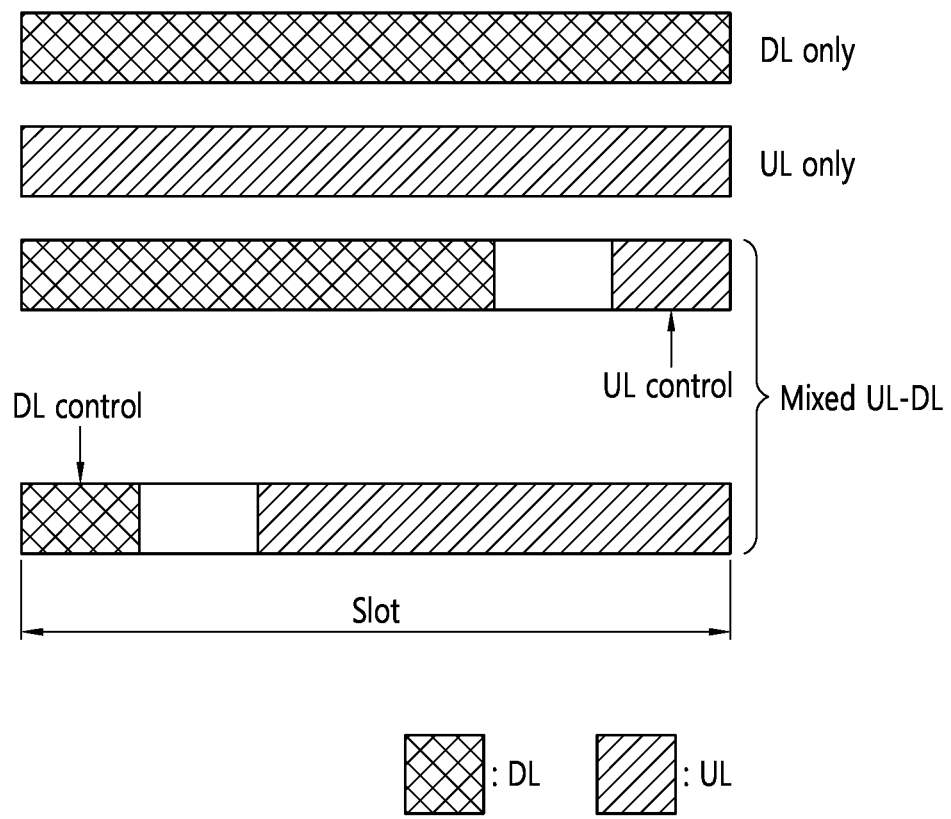
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
  DL region+Guard period (GP)+UL control region
  DL control region+GP+UL region Here, DL region may be (i) DL data region, (ii) DL control region+DL data region. UL region may be (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
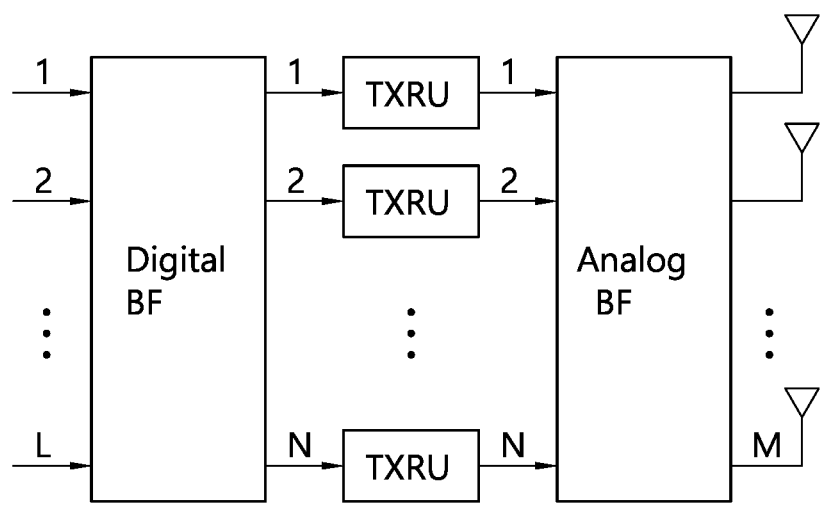
FIG. 12 is an abstract schematic diagram illustrating hybrid beamforming from the viewpoint of TXRUs and physical antennas.

FIG. 12 is an abstract schematic diagram illustrating hybrid beamforming from the viewpoint of TXRUs and physical antennas.

In FIG. 12, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 12, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 13:
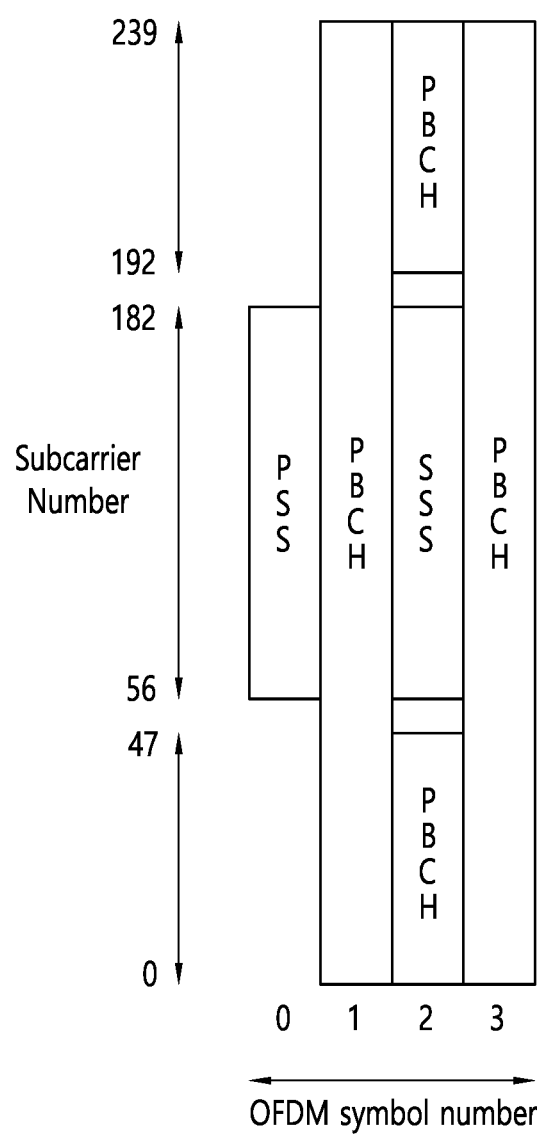
FIG. 13 schematically illustrates a synchronization signal/PBCH (SS/PBCH) block.

FIG. 13 schematically illustrates a synchronization signal/PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A-Subcarrier spacing of 15 kHz: The first symbols of the candidate SS/PBCH blocks have an index represented by $\{2, 8\}+14*n$ where $n=0, 1$ for a carrier frequency of 3 GHz or less and $n=0, 1, 2, 3$ for a carrier frequency which is greater than 3 GHz and is less than or equal to 6 GHz.

Case B-Subcarrier spacing of 30 kHz: The first symbols of the candidate SS/PBCH blocks have an index represented by $\{4, 8, 16, 20\}+28*n$ where $n=0$ for a carrier frequency of 3 GHz or less and $n=0, 1$ for a carrier frequency which is greater than 3 GHz and is less than or equal to 6 GHz.

Case C-Subcarrier spacing of 30 kHz: The first symbols of the candidate SS/PBCH blocks have an index represented by $\{2, 8\}+14*n$ where $n=0, 1$ for a carrier frequency of 3 GHz or less and $n=0, 1, 2, 3$ for a carrier frequency which is greater than 3 GHz and is less than or equal to 6 GHz.

Case D-Subcarrier spacing of 120 kHz: The first symbols of the candidate SS/PBCH blocks have an index represented by $\{4, 8, 16, 20\}+28*n$ where $n=0, 1, 2, 3, 5, 6, 7, 8, 10, 11, 12, 13, 15, 16, 17, 18$ for a carrier frequency greater than 6 GHz.

Case E-Subcarrier spacing of 240 kHz: The first symbols of the candidate SS/PBCH blocks have an index represented by $\{8, 12, 16, 20, 32, 36, 40, 44\}+56*n$ where $n=0, 1, 2, 3, 5, 6, 7, 8$ for a carrier frequency greater than 6 GHz.

The candidate SS/PBCH blocks in the half frame are indexed in ascending order from 0 to L-1 on the time axis. The UE needs to determine two LSBs for L=4 of the SS/PBCH block index per half frame and three LSBs for L>4 from one-to-one mapping with the index of a DM-RS sequence transmitted in the PBCH. For L-64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 14:
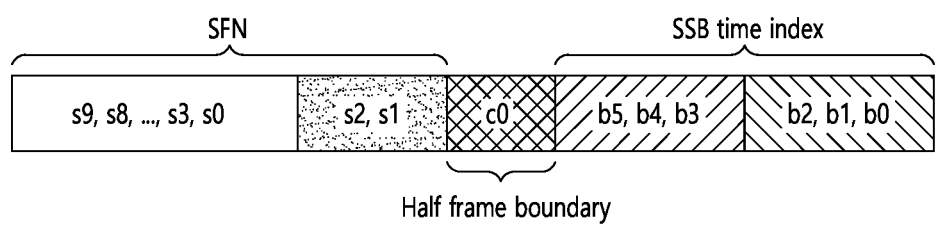
FIG. 14 illustrates a method for a UE to obtain timing information.

FIG. 14 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHZ, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHZ).

In initial cell selection, the UE may assume that a half frame having SS/PBCH blocks occurs with a periodicity of two frames. Upon detecting an SS/PBCH block, when $k_{ssB} \leq 23$ for FR1 and $k_{ssB} \leq 11$ for FR2, the UE determines that a control resource set for a Type0-PDCCH common search space exists. When $k_{ssB} > 23$ for FR1 and $k_{ssB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBs) where:

the MIB is transmitted always on a BCH according to a period of 80 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
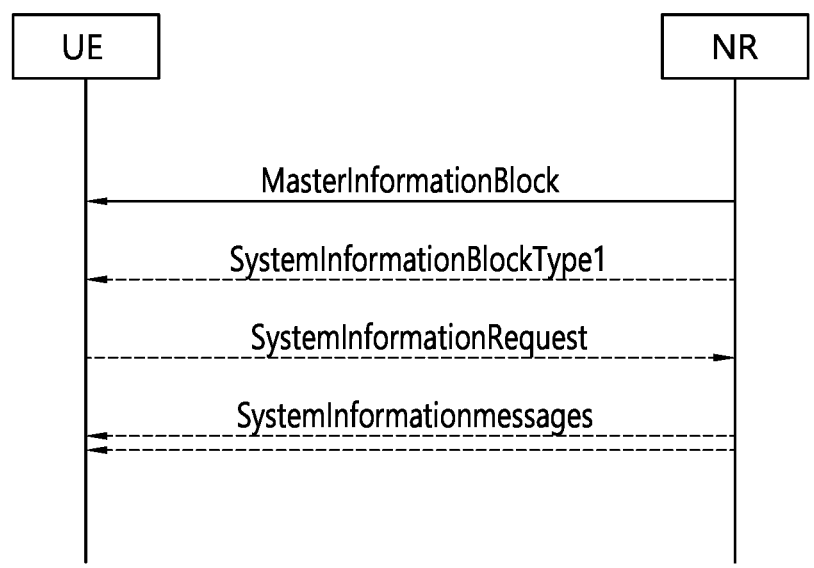
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 5.

TABLE 5

| | Type of signal | Operation/obtained information |
|---|---|---|
| Step 1 | Uplink PRACH preamble | To obtain initial beam Random election of RA-preamble ID |
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 16:
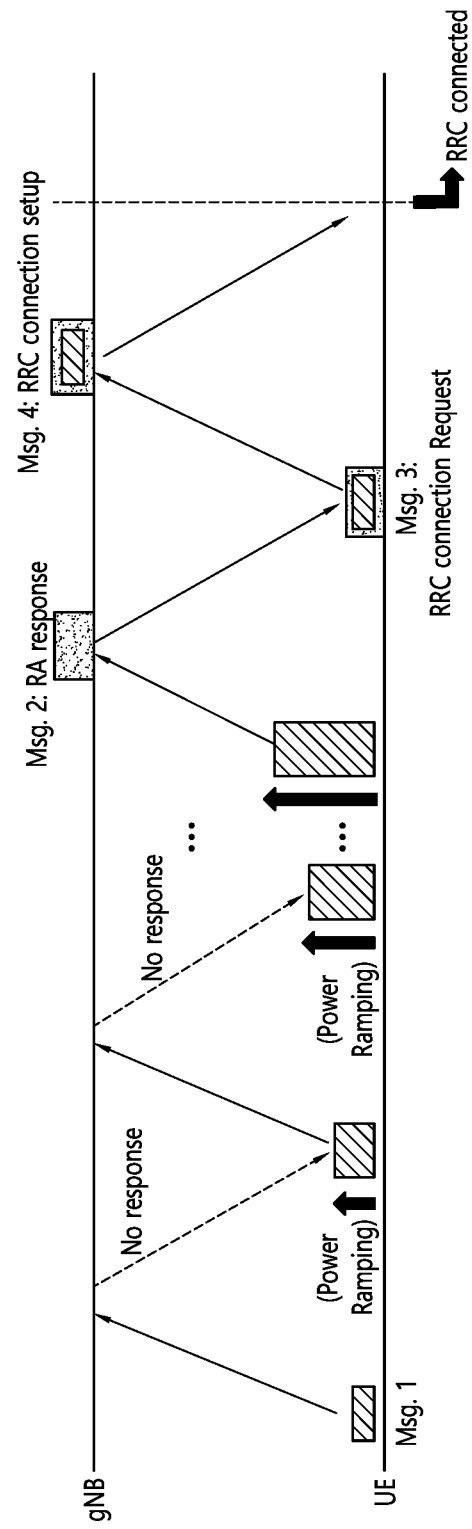
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
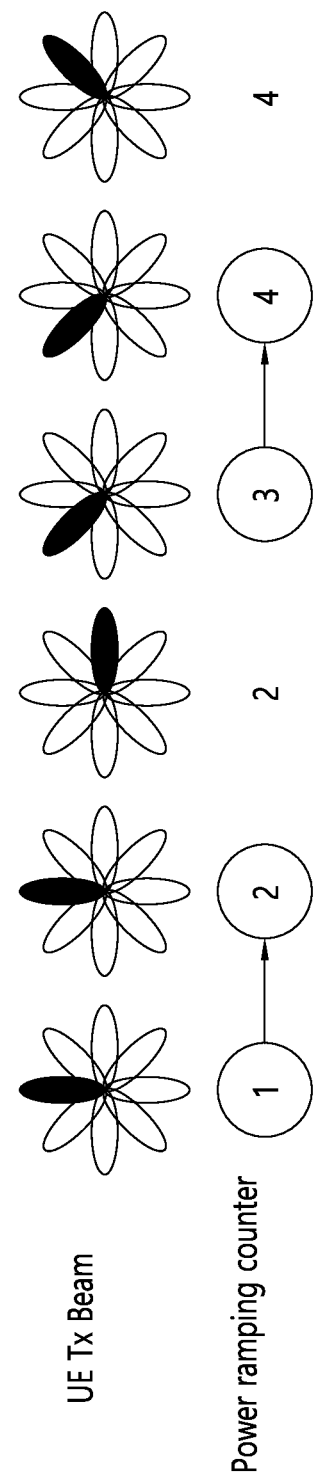
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
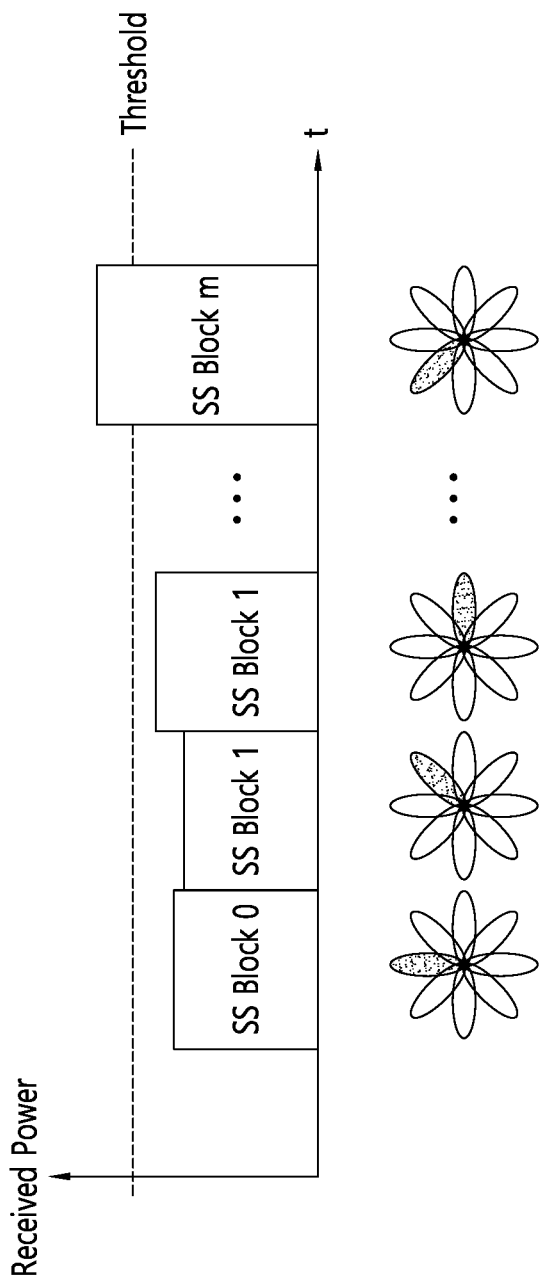
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE.

RRC_INACTIVE state: State in which a wireless connection (RRC connection) is established between a base station and a UE but is deactivated.

RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 19:
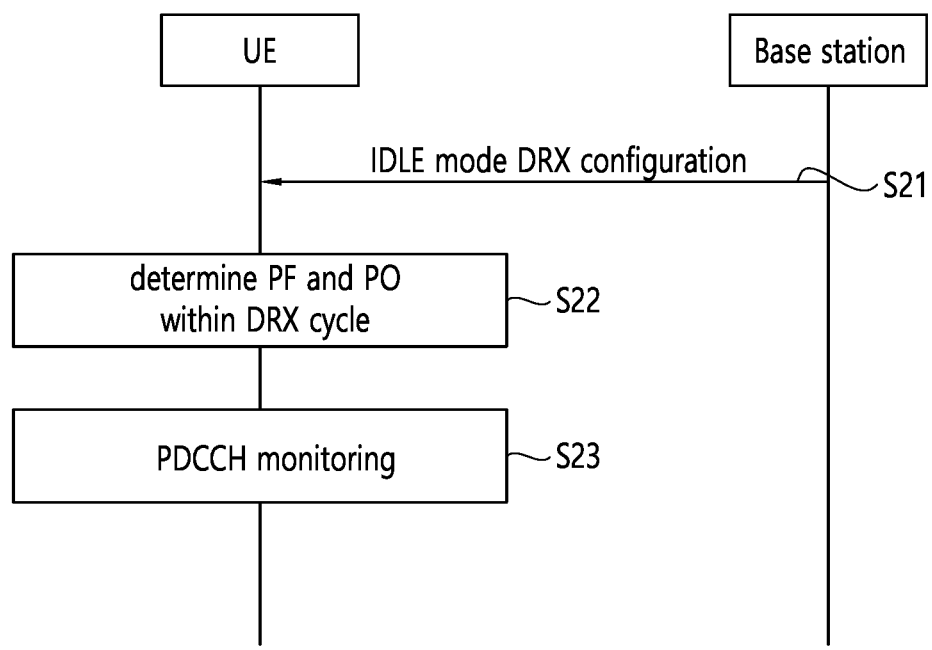
FIG. 19 is a flowchart illustrating an example of performing an idle-mode DRX operation.

FIG. 19 is a flowchart illustrating an example of performing an idle-mode DRX operation.

Referring to FIG. 19, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 20:
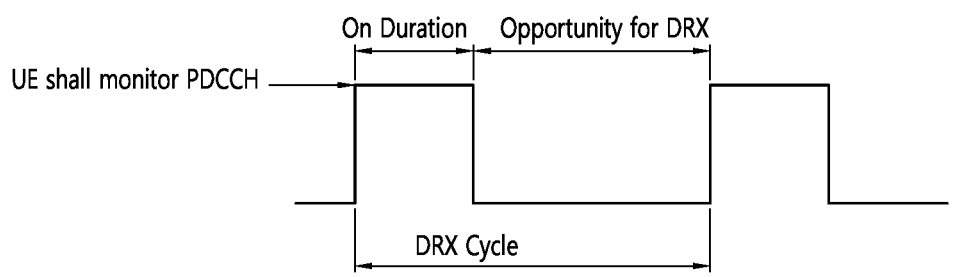
FIG. 20 illustrates a DRX cycle.

FIG. 20 illustrates a DRX cycle.

Referring to FIG. 20, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends. Therefore, when the DRX is configured, in the performing of the procedure and/or methods described/proposed above, PDCCH monitoring/reception may be performed discontinuously in a time domain. For example, when the DRX is configured, in the present disclosure, a PDCCH reception occasion (e.g., a slot having a PDCCH search space) may be configured discontinuously according to the DRX configuration. Otherwise, if the DRX is not configured, in the performing of the procedure and/or methods described/proposed above, PDCCH monitoring/reception may be performed continuously in the time domain. For example, when the DRX is not configured, in the present disclosure, a PDCCH reception occasion (e.g., a slot having a PDCCH search space) may be configured continuously. Meanwhile, regardless of whether the DRX is configured, PDCCH monitoring may be restricted in a duration configured as a measurement gap.

Table 6 shows a UE procedure related to DRX (RRC_CONNECTED state). Referring to Table 6, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 6

| | Type of signals | UE procedure |
|---|---|---|
| 1st step | RRC signalling (MAC-CellGroupConfig) | Receive DRX configuration information |
| 2nd step | MAC CE ((Long) DRX command MAC CE) | Receive DRX command |
| 3rd step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDuration Timer: This defines a length of a starting duration of a DRX cycle. It may be a timer related to a DRX-on duration.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerDL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awake state.

Hereinafter, an integrated access and backhaul link (IAB) will be described. Meanwhile, for convenience of description, the proposed method will be described based on a new RAT (NR) system below. However, the range of systems to which the proposed method is applied may be extended to other systems such as 3GPP LTE/LTE-A systems in addition to the NR system.

One of the potential technologies aimed at enabling future cellular network deployment scenarios and applications is support for wireless backhaul and relay links, which allows flexible and very dense deployment of NR cells without the need to proportionally densify a transport network.

Since it is expected that a wider bandwidth will be available in NR than in LET along with native deployment of massive MIMO or multi-beam systems (e.g., mmWave spectrum), occasions for development and deployment of integrated access and backhaul links are created. This allows for easier deployment of a dense network of self-backhauled NR cells in a more integrated manner by establishing multiple control and data channels/procedures defined to provide access to terminals. Such a system is referred to as integrated access and backhaul links (IAB).

The present disclosure defines the following.

AC(x): access link between node x and UE(s)

BH(xy): backhaul link between node x and node y

In this case, a node may mean a donor gNB (DgNB) or a relay node (RN). Here, a DgNB or a donor node may be a gNB that provides a function of supporting backhaul for IAB nodes.

In addition, in the present disclosure, when relay node 1 and relay node 2 are present, relay node 1 is called a parent node of relay node 2, and relay node 2 is called a child node of relay node 1 in a case where relay node 1 is connected to relay node 2 by a backhaul link and relays data transmitted/received to/from relay node 2 for convenience of explanation.

The following drawings are for describing a specific example of the present disclosure. Since the names of specific devices or the names of specific signals/messages/fields described in the drawings are presented by way of example, the technical features of the present disclosure are not limited to the specific names used in the following drawings.

Figure 21:
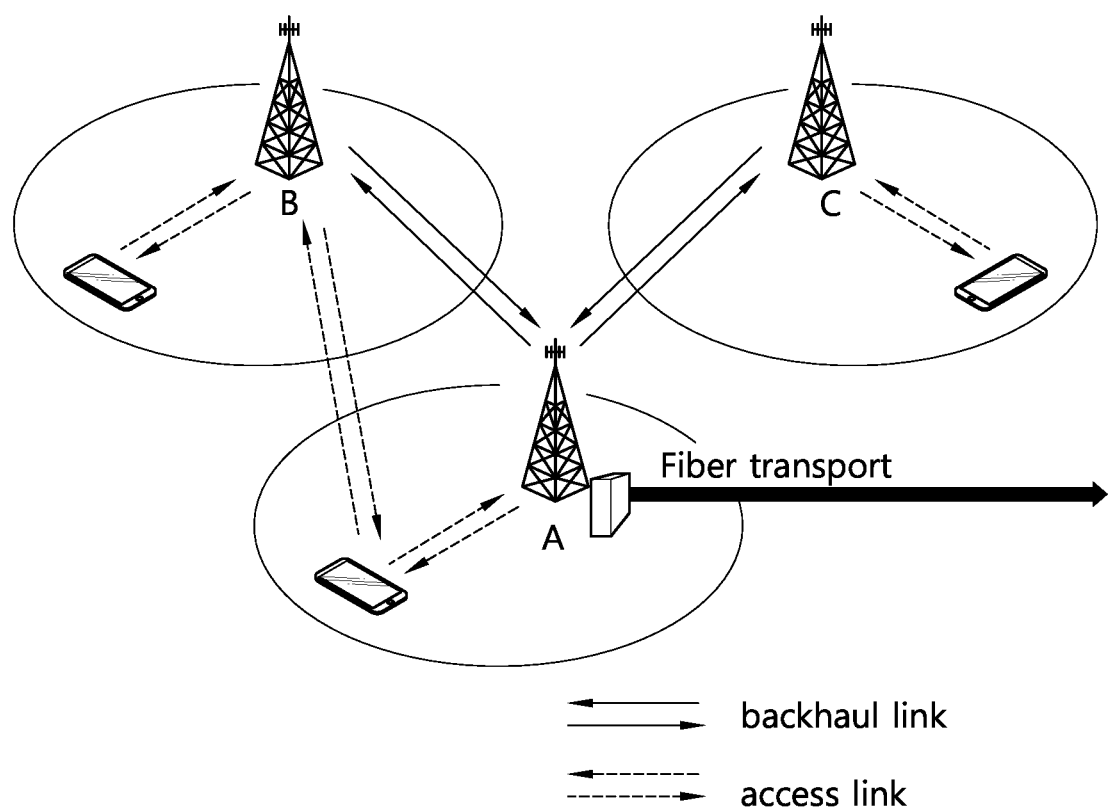
FIG. 21 schematically illustrates an example of a network having an integrated access and backhaul (IAB) link.

FIG. 21 schematically illustrates an example of a network having an integrated access and backhaul (IAB) link.

Referring to FIG. 21, relay nodes (rTRPs) may multiplex access and backhaul links in a time, frequency, or space domain (i.e., a beam-based operation).

Different links may operate on the same frequency or on different frequencies (which may be referred to as an in-band relay and an out-band relay, respectively). It is important to efficiently support out-band relays for some NR deployment scenarios, while it is crucial to understand requirements for an in-band operation involving close interworking with an access link operating on the same frequency to accommodate duplex constraints and to avoid/mitigate interference.

Furthermore, operating an NR system in a millimeter wave spectrum has unique challenges, including experiencing severe short-term blocking which may not be easily mitigated by a current RRC-based handover mechanism due to a greater scale of time required to complete the procedure than that for short-term blocking. To overcome short-term blocking in a millimeter wave system, a fast RAN-based mechanism for switching between rTRPs that does not necessarily require inclusion of a core network may be required. A demand for mitigation of short-term blocking for an NR operation in a millimeter wave spectrum, along with a demand for easier deployment of self-backhauled NR cells, raises a need for development of an integrated framework that allows fast switching of access and backhaul links. Over-the-air coordination between rTRPs may also be considered to mitigate interference and to support end-to-end path selection and optimization.

The following requirements and aspects need to be achieved by an IAB for NR.

Efficient and flexible operation for in-band and out-band relaying in indoor and outdoor scenarios Multi-hop and redundant connection End-to-end path selection and optimization Support of backhaul links with high spectral efficiency Support of legacy NR terminals;

Legacy NR is designed to support half-duplex devices. Thus, half duplex may be supported and useful in an IAB scenario. Furthermore, IAB devices with full duplex may also be considered.

In an IAB scenario, when each relay node (RN) does not have scheduling capability, a donor gNB (DgNB) needs to schedule all links between the DgNB, related relay nodes, and UEs. That is, the DgNB needs to determine scheduling of all the links by collecting traffic information from all the related relay nodes and needs to report scheduling information to each node.

On the other hand, distributed scheduling may be performed when each relay node has scheduling capability. Distributed scheduling enables immediate scheduling in response to an uplink scheduling request from a UE and allows a backhaul/access link to be flexibly used by reflecting surrounding traffic conditions.

Figure 22:
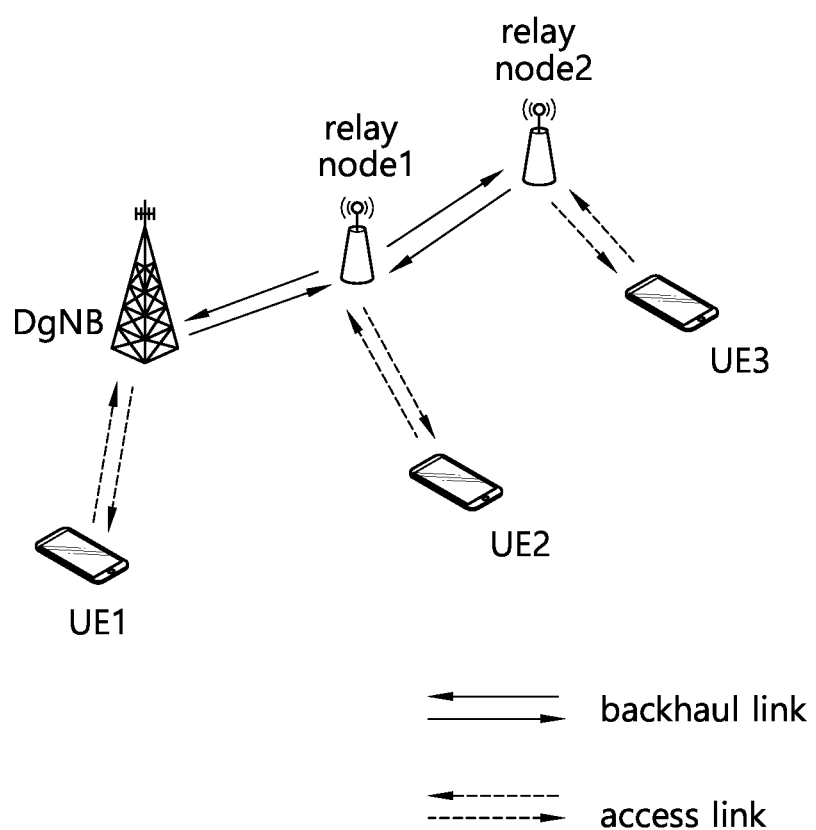
FIG. 22 schematically illustrates an example of the configuration of access and backhaul links.

FIG. 22 schematically illustrates an example of the configuration of access and backhaul links.

FIG. 22 shows an example in which a backhaul link and an access link are configured when there are a DgNB and IAB relay nodes (RNs). DgNB and RN1 are connected via a backhaul link, RN2 is connected to RN1 via a backhaul link, DgNB and UE1 are connected via an access link, RN1 and UE2 are connected via an access link, and RN2 and UE3 are connected via an access link.

Referring to FIG. 22, the DgNB receives not only a scheduling request from UE1 but also scheduling requests from UE2 and UE3. The DgNB determines scheduling of two back links and three access links and reports scheduling results. This centralized scheduling involves a scheduling delay and incurs latency.

On the other hand, distributed scheduling may be performed when each relay node has scheduling capability. Accordingly, it is possible to perform immediate scheduling in response to an uplink scheduling request from a UE terminal and to flexibly use backhaul/access links by reflecting surrounding traffic conditions.

Figure 23:
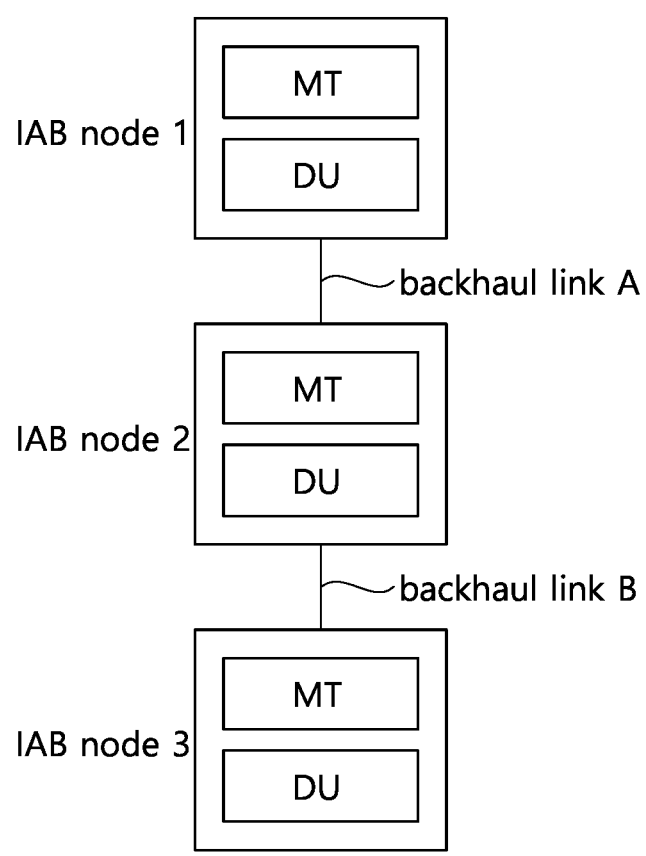
FIG. 23 illustrates a link and relationship between IAB nodes.

FIG. 23 illustrates links and relationship between IAB nodes.

Referring to FIG. 23, IAB node 1 is connected to IAB node 2 through backhaul link A. With respect to backhaul link A, IAB node 1 is a parent node of IAB node 2, and IAB node 2 is a child node of IAB node 1. In addition, IAB node 2 is connected to IAB node 3 through backhaul link B. With respect to backhaul link B, IAB node 2 is a parent node of IAB node 3, and IAB node 3 is a child node of IAB node 2. Meanwhile, in the present disclosure, a child node of an IAB node may be another IAB node or a UE.

Here, each IAB node may execute two functions. One is mobile termination (MT), which maintains wireless backhaul connection to a higher IAB node or a donor node, and the other is a DU (distributed unit), which provides access connection to UEs or connection to an MT of a lower IAB node.

For example, in terms of IAB Node 2, the DU of IAB Node 2 is functionally linked to the MT of IAB Node 3 by backhaul link B, and the same time, the MT of IAB Node 2 is functionally linked to the DU of IAB node 1 by backhauled link A. Here, the child link of the DU of IAB node 2 may mean backhaul link B between IAB node 2 and IAB node 3. Further, the parent link of the MT of IAB node 2 may mean backhaul link A between IAB node 2 and IAB node 1. In addition, although not shown in FIG. 23, the child link of the DU of IAB node 2 may mean an access link with a UE/access UE connected to IAB node 2.

Hereinafter, initial access of an IAB node will be described.

In order to initially establish a connection with a parent node or a donor node, the IAB node may follow the same procedure as the initial access procedure of a UE including cell search, system information acquisition, and random access. SSB/CSI-RS based RRM measurement is the starting point of IAB node discovery and measurement.

A method of avoiding SSB configuration collision between IAB nodes, and an inter-IAB node discovery procedure that applies half-duplex restriction and multi-hop topology including feasibility of CSI-RS based IAB node discovery need to be considered. Considering a cell ID used by a given IAB node, the following two cases may be considered.

Case 1: a donor node and an IAB node share the same cell ID

Case 2: a donor node and an IAB node maintain separate cell IDs

Furthermore, a mechanism for multiplexing of RACH transmission from UEs and RACH transmission from IAB nodes should be further considered.

Hereinafter, backhaul link measurement will be described.

Measurement for multiple backhaul links for link management and path selection needs to be considered. To support half-duplex restriction in terms of a given IAB node, IAB supports detection and measurement of candidate backhaul links (after initial access) that use resources orthogonal to resources used by access UEs for cell detection and measurement. In this regard, the following may be further considered.

TDM of a plurality of SSBs (which may follow hop order, cell ID, and the like, for example)

SSB muting across IAB nodes

Multiplexing of SSB for access UEs and IAB nodes within a half-frame or across half-frames Additional IAB node discovery signal TDMed with SSB transmission (for example, CSI-RS)

Use of off-raster SSB

Different transmission periods for backhaul link detection and measurement compared to periods used by access UEs Coordination mechanisms for different solutions, including a coordination mechanism for measurement time and reference signal (RS) transmission for IAB nodes, need to be additionally considered.

Enhancement of SMTC and CSI-RS configuration for supporting RRM measurement for IAB nodes may be considered.

Hereinafter, backhaul link management will be described.

IAB nodes support a mechanism for detecting/recovering backhaul link failure. Improvements in a radio link monitoring reference signal (RLM RS) and related procedures for IAB may be further considered.

Hereinafter, a mechanism for path change or transmission/reception in a plurality of backhaul links will be described.

Mechanism (e.g., multi-TRP (Tx/Rx point) operation and multi-TRP operation and intra-frequency dual connectivity) for efficient path change or transmission/reception in a plurality of backhaul links need to be simultaneously considered.

Hereinafter, scheduling of backhaul and access links will be described.

Downlink IAB node transmission (i.e., transmission from an IAB node to a child IAB node served by the IAB node on a backhaul link and transmission from an IAB node on an access link to UEs served by the IAB node on an access link) needs to be scheduled by the IAB node. Uplink IAB transmission (transmission from an IAB node to the parent node or donor node thereof on a backhaul link) needs to be scheduled by the parent node or the donor node.

Hereinafter, multiplexing of access and backhaul links will be described.

IAB supports TDM, FDM and SDM between access and backhaul links at an IAB node according to half-duplex restrictions. A mechanism for efficient frequency division multiplexing(FDM)/spatial division multiplexing (SDM)

multiplexing of access/backhaul traffic over multiple hops in consideration of account IAB node half-duplex restriction needs to be considered. The following solutions for different multiplexing options may be additionally considered.

Mechanism for orthogonal partitioning of time slots or frequency resources between access and backhaul links over one or more hops Utilization of different DL/UL slot configurations for access and backhaul links DL and UL power control enhancement and timing requirements for allowing intra-panel FDM and SDM of backhaul and access links Interference management including cross-link interference Hereinafter, resource coordination will be described.

A mechanism for scheduling coordination, resource allocation, and path selection over an IAB node/donor node and multiple backhaul hops needs to be considered. Coordination of resources (frequency, time in terms of slot/slot format, etc.) between semi-static IAB nodes (on the time scale of RRC signaling) needs to be supported. The following aspects may be additionally considered.

Distributed or centralized coordination mechanism

Resource granularity of a required signal (e.g., TDD configuration pattern)

Exchange of layer-1 (L1) and/or layer-3 (L3) measurements between IAB nodes

Exchange of topology-related information (e.g., hop order) affecting backhaul link physical layer design Coordination of resources (frequency, time in terms of slot/slot format, etc.) faster than semi-static coordination Hereinafter, IAB node synchronization and timing alignment will be described.

Feasibility of over-the-air (OTA) synchronization and the influence of timing misalignment on IAB performance (e.g., the number of supportable hops) need to be considered. A mechanism for timing alignment over multi-hop NR-IAB networks needs to be considered. IAB supports timing advance (TA)-based synchronization between IAB nodes, including a case of spanning multiple backhaul hops. Improvement with respect to conventional timing alignment mechanisms needs to be additionally considered.

The following cases of transmission timing alignment over IAB nodes and donor nodes need to be additionally considered.

Case 1: Downlink transmission timing alignment over IAB nodes and donor nodes

Case 2: Alignment of downlink and uplink transmission timings within an IAB node Case 3: Alignment of downlink and uplink reception timing in the IAB node Case 4: During transmission of case 2 in an IAB node during reception of case 2

Case 5: Case 1 in the case of access link dimming in different time slots and case 4 for backhaul link timing Alignment of the next level between IAB nodes/donor nodes or in IAB nodes needs to be additionally considered.

Slot-level sorting

Symbol-level alignment

No alignment

TDM/FDM/SDM multiplexing of access and backhaul links, the influence of different cases on cross-link interference and the influence of access UEs may be additionally considered.

Hereinafter, cross-link interference measurement and management will be described.

The influence of cross-link interference (CLI) on access and backhaul links (including spanning multiple hops) needs to be considered. Furthermore, interference measurement and management solutions need to be considered.

Hereinafter, a CLI mitigation technique will be described.

A CLI mitigation technique including advanced receiver and transmitter coordination should be considered and priority should be determined in terms of complexity and performance. The CLI mitigation technique needs to be able to manage the following IAB-to-node interference scenarios.

Case 1: A victim IAB node performs reception on downlink through the MT thereof and an interfering IAB node performs transmission on uplink through the MT thereof.

Case 2: A victim IAB node performs reception on downlink through the MT thereof and an interfering IAB node performs transmission on downlink through the DU thereof.

Case 3: A victim IAB node performs reception on uplink through the DU thereof and an interfering IAB node performs transmission on downlink through the MT thereof.

Case 4: A victim IAB node performs reception on uplink through the DU thereof and an interfering IAB node performs transmission on downlink through the DU thereof.

In the case of FDM/SDM reception between access and backhaul links at a given IAB node, interference experienced at the IAB node needs to be additionally considered.

Hereinafter, spectral efficiency enhancement will be described.

Support of 1024 quadrature amplitude modulation (QAM) for a backhaul link needs to be considered.

As described above, the IAB node may operate like a UE in relation to a base station (or a parent node). In addition, the IAB node may operate like a base station in relation to a UE (or a child node) connected thereto. In this regard, a terminal/UE may be an IAB node in the present disclosure. For example, in description/drawings related to the downlink transmission/reception operation between a base station and a UE, the UE may be an IAB node. Alternatively, the base station/BS may be an IAB node. Similarly, in description/drawings related to the uplink transmission/reception operation, a terminal/UE may be an IAB node or a base station/BS may be an IAB node.

Hereinafter, the proposal of the present disclosure will be described in more detail.

The following drawings illustrate a specific example of the present disclosure. Since the names of specific devices or the names of specific signals/messages/fields described in the drawings are presented by way of example, the technical features of the present disclosure are not limited to the specific names used in the following drawings.

The present disclosure is described assuming an in-band environment, but may also be applied in an out-band environment. In addition, the present disclosure is described in consideration of an environment in which a DgNB, a relay node (RN), and a UE perform a half-duplex operation, but the present disclosure may also be applied to an environment in which the DgNB, the RN, and/or the UE perform a full-duplex operation.

From an MT perspective of an IAB node, the following time-domain resources may be indicated for a parent link.

Downlink (DL) time resource

Uplink (UL) time resource

Flexible (F) time resource

From a DU perspective of an IAB node, a child link has the following time resource types.
  Downlink (DL) time resource
  Uplink (UL) time resource
  Flexible (F) time resource
Each of a downlink time resource, an uplink time resource, and a flexible time resource for a DU child link may belong to one of the following two categories.
  Hard resource: A time resource that is always available for a DU child link
  Soft resource: A time resource the availability of which for a DU child link is explicitly or implicitly controlled by a parent node
  Not-available (NA) time resource (resource not used for communication via a DU child link)

From a DU perspective of an IAB node, there are four types of time resources, which are DL, UL, F and NA, for a child link from. An NA time resource refers to a resource that is not used for communication on a DU child link.

Each of DL, UL, and F time resources of a DU child link may be a hard resource or a soft resource. The hard resource may mean a resource that is always available for communication on the DU child link. However, the soft resource may be a resource whose availability for communication on the DU child link is explicitly and/or implicitly controlled by a parent node.

In the present disclosure, configuration for a link direction and link availability of time resources for a DU child link may be referred to as a DU configuration. The DU configuration may be used for effective multiplexing and interference handling between IAB nodes. For example, the DU configuration may be used to indicate which link is a valid link with respect to time resources between a parent link and a child link. In addition, only a subset of child nodes can be used for interference coordination between child nodes by being configured to use time resources for DU operation. Considering this aspect, the DU configuration may be more effective when configured semi-statically.

On the other hand, availability of soft resources may be dynamically set by L1-based implicit/explicit signaling. IA means that DU resources are explicitly or implicitly available, and INA means that DU resources are explicitly or implicitly unavailable. Dynamic L1-based signaling may indicate whether a DU soft resource is IA or INA.

Meanwhile, similarly to a slot format indication (SFI) configuration for an access link, an IAB node MT may have three types of time resources of DL, UL, and F for the parent link thereof.

Figure 24:
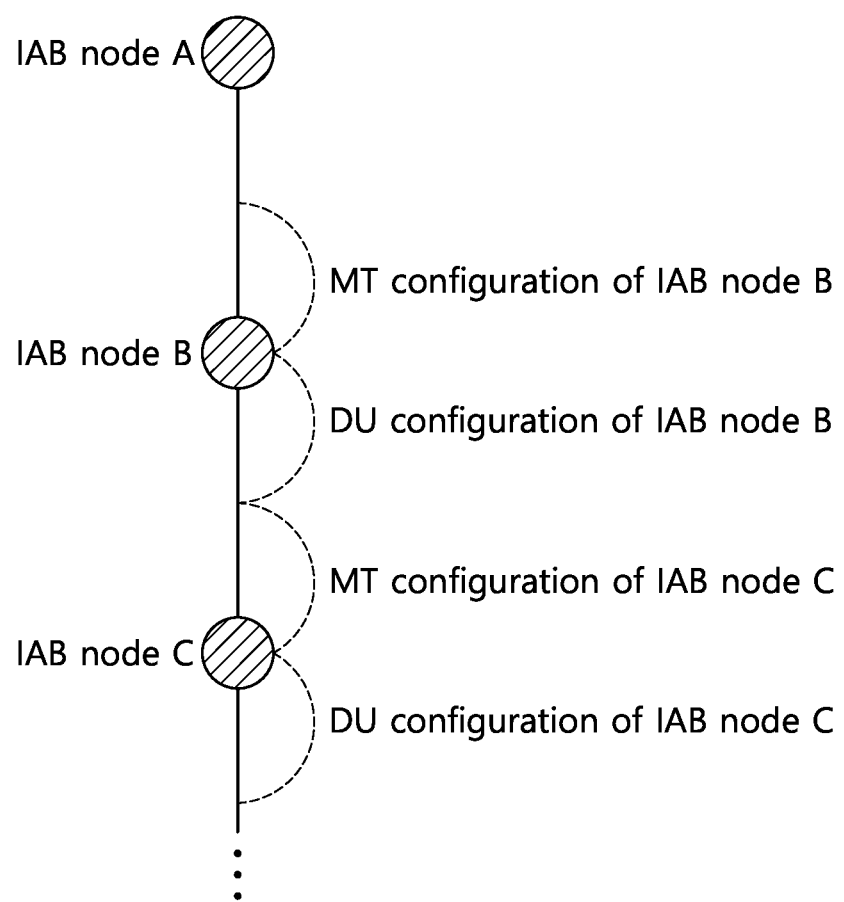
FIG. 24 illustrates an MT configuration and a DU configuration.

FIG. 24 illustrates an MT configuration and a DU configuration.

Referring to FIG. 24, IAB node A, IAB node B, and IAB node C are present, IAB node A is the parent node of IAB node B, and IAB node C is a child node of IAB node B.

Referring to FIG. 24, an IAB node may receive an MT configuration indicating link direction information on a parent link between the UAB node and the parent node thereof for communication with the parent node. In addition, the IAB node may receive a DU configuration indicating link direction and availability information that can be used for communication with a child node thereof.

Here, as an example, an MT configuration of IAB node B may include link direction information on the link between IAB node A and IAB node B from the point of view of IAB node B, and a DU configuration of IAB node B may include link direction and availability information on the link between IAB node B and IAB node C from the point of view of the IAB node B. In addition, an MT configuration of IAB node C may include link direction information on the link between IAB node B and IAB node C from the point of view of IAB node, and a DU configuration of IAB node C may include link direction and availability information on the link between a child node of IAB node C or a UE connected to IAB node C and IAB node C from the point of view of the IAB node C.

Further, as an example, an operation performed by IAB node B on IAB node C, which is the child node thereof, may be referred to as a DU operation of IAB node B. In addition, an operation performed by IAB node B on IAB node A, which is the parent node thereof, may be referred to as an MT operation of IAB node B.

Meanwhile, referring to FIG. 24, DU resources of IAB node B may mean resources of IAB node B for the link between IAB node B and IAB node C. Here, the link direction and availability of the DU resources of IAB node B may be determined by the DU configuration received by IAB node B. In addition, MT resources of IAB node B may mean resources of IAB node B for the link between IAB node B and IAB node A. Here, the link direction of the MT resources of IAB node B may be determined by the MT configuration received by IAB node B.

Meanwhile, only arbitrary classification has been described above, and resource types in terms of the IAB node DU may be UL, DL, and F and configuration for availability may be classified into NA, hard resource, and soft resource. Specifically, an IAB node may receive resource configuration information. Here, the resource configuration information may include link direction information and availability information. The link direction information may indicate whether the type of a specific resource is UL, DL, or F, and the availability information may indicate whether the specific resource is a hard resource or a soft resource. Alternatively, the link direction information may indicate whether the type of a specific resource is UL, DL, F, or NA, and the availability information may indicate whether the specific resource is a hard resource or a soft resource.

As described above, an IAB node may receive an MT configuration indicating link direction information on a parent link between the UAB mode and the parent node thereof for communication with the parent node. In addition, the IAB node may receive a DU configuration indicating link direction and link availability information that can be used for communication with the child link thereof.

In the present disclosure, an environment in which the MT and the DU constituting an IAB node operate in the same frequency domain or with the same center frequency, and the MT operation and the DU operation cannot be simultaneously performed and are TDMed and performed is assumed.

Further, an environment in which a plurality of child nodes is connected to a DU/central unit (CU) is considered in the present disclosure. In this case, it is assumed that the plurality of child node links operates in the same frequency domain or with the same center frequency.

Figure 25:
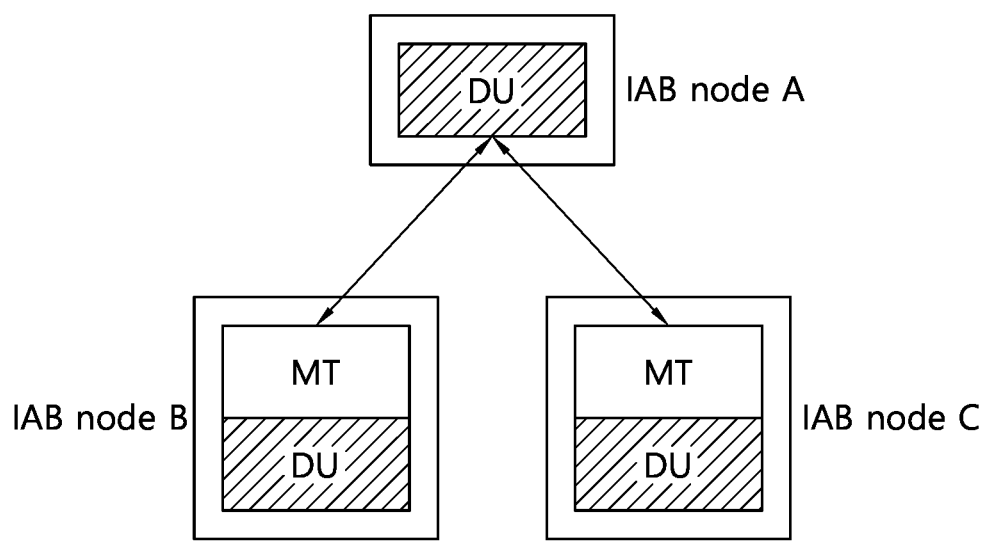
FIG. 25 schematically illustrates a situation in which a plurality of child nodes is connected to one IAB node.

FIG. 25 schematically illustrates a situation in which a plurality of child nodes is connected to one IAB node.

Referring to FIG. 25, IAB node A, IAB node B, and IAB node C are present, and the DU of IAB node A is connected to the MT of IAB node B and the MT of IAB node C. In other words, IAB node B and IAB node C are child nodes of IAB node A and are connected to IAB node A by child links or child node links. Meanwhile, a child node of an IAB node may be a UE as well as another IAB node. In the present disclosure, a link between an IAB node and a UE may also be referred to as a child link or a child node link for convenience of description.

When a plurality of child nodes is present from the standpoint of an IAB node DU, the same DU resource direction configuration may be allocated and applied to respective child node links. Here, the DU resource direction configuration may be a configuration constituting a DU configuration and may be a configuration indicating the resource direction of a DU child link, that is, a downlink resource, an uplink resource, and/or a flexible resource. In addition, from the standpoint of the IAB node DU, different DU resource availability configurations may be allocated and applied to respective child nodes. Here, a DU resource availability configuration is a configuration constituting a DU configuration and may be a configuration indicating whether a DU child link is available, that is, a hard resource, a soft resource, and/or an NA resource.

In other words, the conventional DU resource direction configuration and DU resource availability configuration may be set IAB node DU-specifically, that is, IAB node DU-cell-specifically. In the next-generation IAB system, a method of setting availability of child link-specific resources is required for more efficient communication in addition to the aforementioned method in consideration of more complicated IAB system environments such as a case in which a plurality of parent IAB nodes are connected to one child IAB node, a case in which there is a plurality of child IAB nodes connected to an IAB node DU, and a case in which SDM/FDM operation between IAB nodes can be performed.

Figure 26:
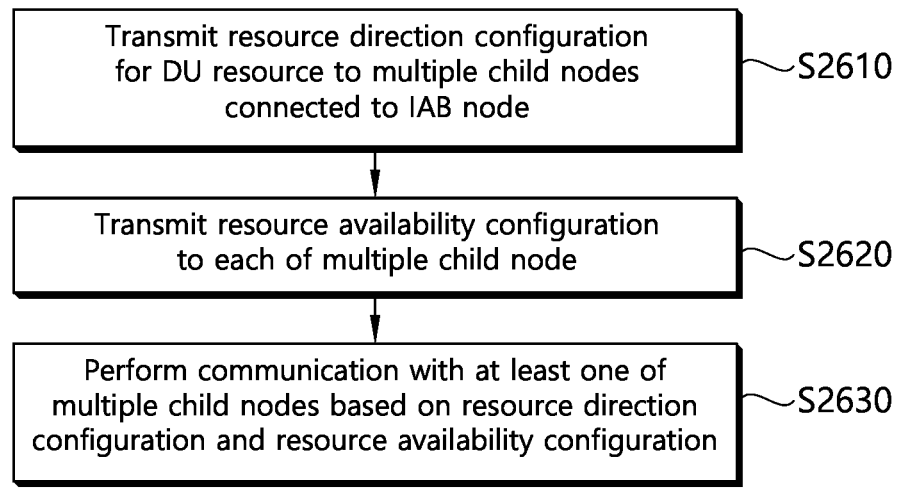
FIG. 26 is a flowchart of an example of an operating method of an IAB node with respect to child nodes thereof according to some implementations of the present disclosure.

FIG. 26 is a flowchart of an example of an operating method of an IAB node with respect to child nodes thereof according to some implementations of the present disclosure.

Referring to FIG. 26, the IAB node transmits a resource direction configuration for DU resources to a plurality of child nodes connected to the IAB node (S2610). Here, the resource direction configuration may indicate a resource direction (downlink, uplink, or flexible) commonly applied to the plurality of child nodes. Further, the plurality of child nodes may include a base station and a UE.

Thereafter, the IAB node transmits a resource availability configuration to each of the plurality of child nodes (S2620). Here, the resource availability configuration may indicate availability (soft, hard, or not available) of the DU resources.

Thereafter, the IAB node performs communication with at least one of the plurality of child nodes based on the resource direction configuration and the resource availability configuration (S2630).

Hereinafter, child node-specific DU resource availability configuration will be described.

Specifically, the IAB node DU may receive a common DU resource availability configuration for child node links of the DU. Thereafter, the IAB node DU may receive an additional DU resource availability configuration that may be applied differently for the child node links. Examples of the additional DU resource availability configuration are as follows.

(Option 1-1) When a specific DU resource is configured as a hard resource by the DU resource availability configuration commonly applied to the child node links of the IAB node DU, the resource may be child node link-specifically changed to a not-available resource, that is, an NA resource. That is, a resource configured as a hard resource by the DU resource availability configuration may be maintained as the hard resource for some child node links and may be changed to an NA resource for some other child node links.

(Option 1-2) When a specific DU resource is set as a hard resource or a soft resource by the DU resource availability configuration commonly applied to the child node links of the IAB node DU, the resource may be child node link-specifically changed to a not-available resource, that is, an NA resource. That is, the availability state of a resource configured as a hard resource or a soft resource by the DU resource availability configuration may be maintained as the hard resource or the soft resource for some child node links and changed to an NA resource for some other child node links.

In other words, in option 1-1, a resource configured by the DU resource availability configuration as a hard resource commonly for a plurality of child node links is a specific child node link In the present disclosure, a configuration in which a child node link-specific NA resource is additionally configured after a DU resource availability configuration common to child node links of an IAB node DU is received may be referred to as a child node-specific NA configuration.

Figure 27:
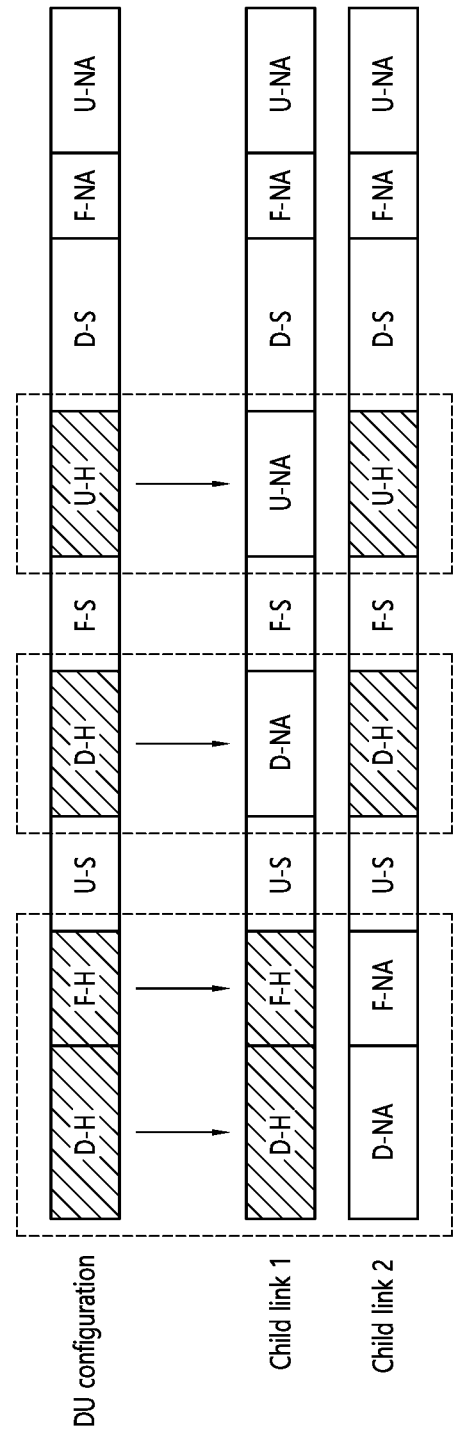
FIG. 27 illustrates an example to which the child node-specific NA configuration is applied according to some implementations of the present disclosure.

FIG. 27 illustrates an example to which the child node-specific NA configuration is applied according to some implementations of the present disclosure.

Referring to FIG. 27, an IAB node DU may DU-specifically receive DU resource availability information through a DU configuration. That is, the DU configuration may be commonly applied to a plurality of child nodes. In the DU configuration, D, F, and U indicate resource directions and refer to downlink, flexible, and uplink resources, respectively. In addition, in the DU configuration, H, S, and NA indicate availability of resources and refer to hard, soft, and not available resources, respectively.

Here, in the case of hard resources indicated by hatching in FIG. 27, the availability thereof may be child node link-specifically or child link-specifically maintained as hard resources or may be changed to NA resources. Referring to FIG. 27, in the case of child link 1, front two hard resource regions may be maintained as hard resources and rear two hard resource regions may be changed to NA resources. Further, referring to FIG. 27, in the case of child link 2, front two hard resource regions may be changed to NA resources and rear two hard resource regions may be maintained as hard resources.

Hereinafter, reconfiguration of availability of DU resources will be described.

When an IAB node DU receives a DU resource configuration including a DU resource availability configuration and a child node-specific NA configuration, the availability for DU resources may be reconfigured based on the following methods. Meanwhile, when the aforementioned option 1-2 is applied together in relation to methods which will be described later, resources to be reconfigured may include a soft resource as well as a hard resource.

(Method 1-1) A DU-specifically configured DU resource availability configuration may be reconfigured.

(Method 1-2) In the case of a resource DU-specifically configured as a hard resource, it may be configured to be changed to an NA resource. Specifically, the following options can be considered.

(Option 2-1) A resource DU-specifically configured as a hard resource may be configured to be maintained as a hard resource for each child node link or to be changed to an NA resource.

(Option 2-2) For a resource DU-specifically configured as a hard resource, an IAB node may receive information on a child node link to be changed to an NA resource. Here, in the case of a child node link that is not configured to be changed to an NA resource, it may be assumed that a configuration for maintaining a hard resource has been received.

(Method 1-3) When a resource DU-specifically configured as a hard resource is child node-specifically changed to an NA resource, the following options may be considered.

(Option 3-1) The corresponding resource may be child node link-specifically changed to a hard resource that is the original resource availability type. In this case, the child node-specific NA configuration may be reconfigured. That is, a resource configured as a hard resource according to the original DU-specific DU resource availability configuration may be configured or reconfigured as a hard resource or an NA resource later.

(Option 3-2) The corresponding resource may be continuously maintained as the NA resource. That is, when a resource configured as a hard resource by a DU-specific DU resource availability configuration is child node-specifically changed to an NA resource, it cannot be changed back to the hard resource and may be maintained as the NA resource. However, when the DU-specific DU resource availability configuration is reconfigured, resource availability information of the corresponding resource may be changed.

(Method 1-4) When a resource DU-specifically configured as a hard resource is child node-specifically configured to be maintained as the hard resource, the following options may be considered.

(Option 4-1) The corresponding resource may be child node-specifically changed to an NA resource later. Here, if this option is applied along with option 3-2 of method 1-3 described above, a resource DU-specifically configured as a hard resource may be child node-specifically changed to an NA resource but cannot be changed back to the hard resource. Further, if this option is applied along with option 3-1 of method 1-3 described above, a resource DU-specifically configured as a hard resource may be child node-specifically configured/reconfigured as a hard resource or an NA resource.

(Option 4-2) The corresponding resource can be maintained as a hard resource. That is, if a resource configured as a hard resource by a DU-specific DU resource availability configuration is child node link-specifically configured to be maintained as a hard resource, it cannot be changed to an NA resource later and may be maintained as a hard resource. However, when the DU-specific DU resource availability configuration is reconfigured, resource availability information of the corresponding resource may be changed.

Meanwhile, the above-described child node-specific NA configuration may be information configured for an IAB node DU through the F1 application protocol (F1-AP). Alternatively, the child node-specific NA configuration may be information dynamically transmitted from a parent IAB node DU through a MAC control element (MAC CE) or DCI. When the child node-specific NA configuration is dynamically transmitted, the MT of the IAB node may receive the dynamic configuration from the parent IAB node DU and transmit the same to the DU of the IAB node. For example, the MAC CE may be used to transmit a resource activation/deactivation command for a specific hard resource to instruct the hard resource to be maintained or to be changed to an NA resource.

In addition, when an NA resource or a hard resource is configured through child node-specific NA configuration, the resource may be configured in units of symbols, slots, or resources having the same resource direction (downlink, uplink, or flexible) within one slot.

On the other hand, when the MT and the DU of an IAB node TDMed to operate, the operation of the MT cannot be performed in resources available for the DU. Accordingly, a method for determining a resource available for the operation of the MT when resource availability of the DU is specific to a child link is proposed hereinafter.

For example, the MT cannot operate in a resource in which at least one of a plurality of DU child node links can operate. As described above, when a DU-specific hard resource is changed to a DU child node-specific NA resource, the MT may determine whether it can operate based on the following methods.

(Method 2-1) A resource DU-specifically configured as a hard resource is determined as a resource in which the MT cannot operate regardless of an additional child node-specific NA configuration. Otherwise, it is determined as a resource in which the MT can operate.

(Method 2-2) A resource DU-specifically configured as a hard resource is determined as a resource in which the MT cannot operate when at least one DU child link is configured or maintained as a hard resource. Otherwise, it is determined as a resource in which the MT can operate.

(Method 2-3) When the DU and the MT are SDMed/FDMed to perform operations, whether the MT can operate may be determined according to the resource direction of the DU even if the DU operates. When the DU and the MT are SDMed/FDMed to operate, if a resource DU-specifically configured as a hard resource is a downlink resource, the MT determines the resource as a resource in which the MT cannot operate when the resource is configured as a downlink resource for the MT. Alternatively, when a resource DU-specifically configured as a hard resource is an uplink resource, if the resource is configured as an uplink resource for the MT, the MT determines the resource as a resource in which the MT cannot operate. Otherwise, it is determined as a resource in which the MT can operate.

(Method 2-4) When the DU and the MT are SDMed/FDMed to operate, whether the MT can operate may be determined according to the resource direction of the DU even if the DU operates. When the DU and the MT are SDMed/FDMed to operate, if a resource is configured or maintained as a hard resource for at least one DU child link and is configured in the downlink direction, the MT determines the resource as a resource in which the MT cannot operate when the resource is configured as a downlink resource for the MT. Alternatively, if a resource is configured or maintained as a hard resource for at least one DU child link and is configured in the uplink direction, the MT determines the resource as a resource in which the MT cannot operate when the resource is configured as an uplink resource for the MT. Otherwise, the resource is determined as a resource in which the MT can operate.

Meanwhile, as described above, when a DU-specific hard resource can be changed to a DU child node-specific NA resource, the IAB node MT determines whether it can operate in a DU soft resource based on the following methods.

(Method 3-1) When a resource DU-specifically configured as a soft resource is indicated or reconfigured as an available resource, the IAB node MT determines the resource as a resource in which the MT cannot operate. Otherwise, it is determined as a resource in which the MT can operate.

(Method 3-2) In the case of a resource DU-specifically configured as a soft resource, if the resource is configured or maintained as a soft resource for at least one DU child link and is indicated or reconfigured as an available resource, the MT determines the resource as a resource in which the MT cannot operate. Otherwise, it is determined as a resource in which the MT can operate.

(Method 3-3) When the DU and the MT are SDMed/FDMed to operate, whether the MT can operate may be determined according to the resource direction of the DU even if the DU operates. When the DU and the MT are SDMed/FDMed to operate, if a resource DU-specifically configured as a soft resource is indicated as an available resource and is a downlink resource, the MT determines the resource as a resource in which the MT cannot operate when the resource is configured as a downlink resource for the MT. Alternatively, if a resource DU-specifically configured as a soft resource is indicated as an available resource and is an uplink resource, the MT determines the resource as a resource in which the MT cannot operate when the resource is configured as an uplink resource for the MT. Otherwise, the resource is determined as a resource in which the MT can operate.

(Method 3-4) When the DU and the MT are SDMed/FDMed to operate, whether the MT can operate may be determined according to the resource direction of the DU even if the DU operates. When the DU and the MT are SDMed/FDMed to operate, if at least one DU child link is configured or maintained as a soft resource, indicated as an available resource, and is a downlink resource, the MT determines the resource as a resource in which the MT cannot operate when the corresponding resource is configured as a downlink resource for the MT. Alternatively, when at least one DU child link is configured or maintained as a soft resource, indicated as an available resource, and is an uplink resource, the MT determines the corresponding resource as a resource in which the MT cannot operate if the resource is configured as an uplink resource for the MT. Otherwise, the resource is determined as a resource in which the MT can operate.

On the other hand, in the case of a DU soft resource, availability/unavailability may be explicitly indicated by a parent node. In this case, availability/unavailability may be a child node link-specifically indicated. For example, a specific DU soft resource may be configured as an available resource for some child node links and may be configured as a not-available resource for the remaining child node links. In this case, when the MT determines whether it can operate, if a specific resource is configured as a soft resource for all or some of DU child links and is indicated as an available resource for at least one DU child link, the MT may determine the resource as a resource in which the MT cannot operate.

Further, in an environment in which a specific DU can have a plurality of DU child node links, different DU resource availability configurations may be provided for the respective DU child node links. In this case, the MT may determine whether it can operate on a specific DU resource based on the following methods.

(Method 4-1) When a specific DU resource is configured as a hard resource for at least one DU child node link, the MT determines the resource as a resource in which the MT cannot operate.

(Method 4-2) When a specific DU resource is configured as a soft resource for at least one DU child node link and indicated as an available resource, the MT determines the resource as a resource in which the MT cannot operate.

(Method 4-3) When a specific DU resource does not correspond to the method 4-1 or the method 4-2, the MT determines the resource as a resource in which the MT can operate.

Figure 28:
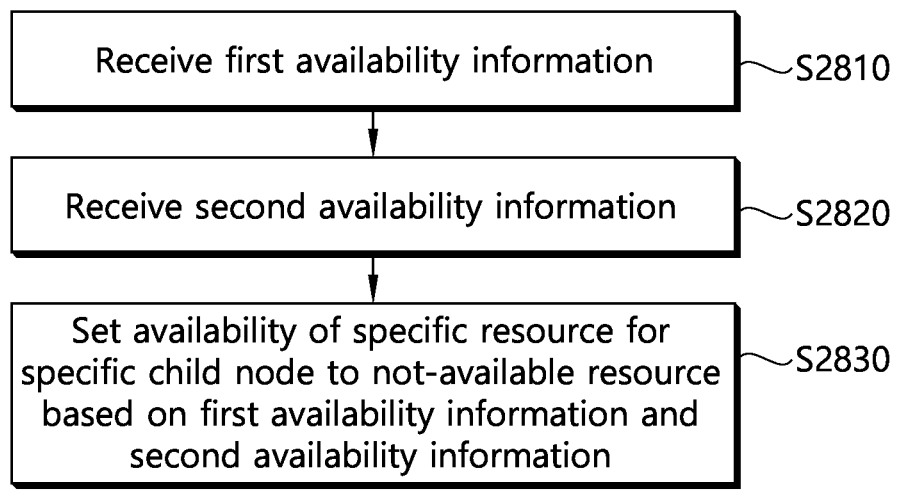
FIG. 28 is a flowchart of an example of a resource availability setting method performed by an IAB node according to some implementations of the present disclosure.

FIG. 28 is a flowchart of an example of a resource availability setting method performed by an IAB node according to some implementations of the present disclosure.

Referring to FIG. 28, the IAB node receives first availability information (S2810). Here, the first availability information may indicate availability of distribution unit (DU) resources of the IAB node.

The IAB node receives second availability information (S2820). Here, the second availability information may be applied to a specific child node among a plurality of child nodes connected to the IAB node. Here, each of the plurality of child nodes may be an access user equipment (access UE) or a base station, that is, another IAB node connected to the IAB node.

Thereafter, the IAB node sets availability of a specific resource for the specific child node to a not-available resource based on the first availability information and the second availability information (S2830).

Here, the first availability information may be commonly applied to the plurality of child nodes. Here, the specific resource may be at least one of a hard resource and a soft resource included in the DU resources. For example, the specific resource may be a hard resource included in the DU resources according to option 1-1, and the specific resource may be a hard resource and a soft resource included in the DU resources according to option 1-2.

The claims described in the present disclosure may be combined in various manners. For example, the technical features of a method claim of the present disclosure may be combined and implemented as an apparatus, and the technical features of an apparatus claim of the present disclosure may be combined and implemented as a method. In addition, the technical features of the method claim of the present disclosure and the technical features of the apparatus claim may be combined and implemented as an apparatus, and the technical features of the method claim of the present disclosure and the technical features of the apparatus claim may be combined and implemented as a method.

The methods proposed in the present disclosure may be executed by an apparatus configured to control an IAB node, which includes at least one computer-readable recording medium including instructions based on being executed by at least one processor, at least one processor, and one at least one memory operably connected to the at least one processor and storing instructions, wherein the at least one processor executes the instructions to perform the methods proposed in the present disclosure, in addition to the IAB node.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 29:
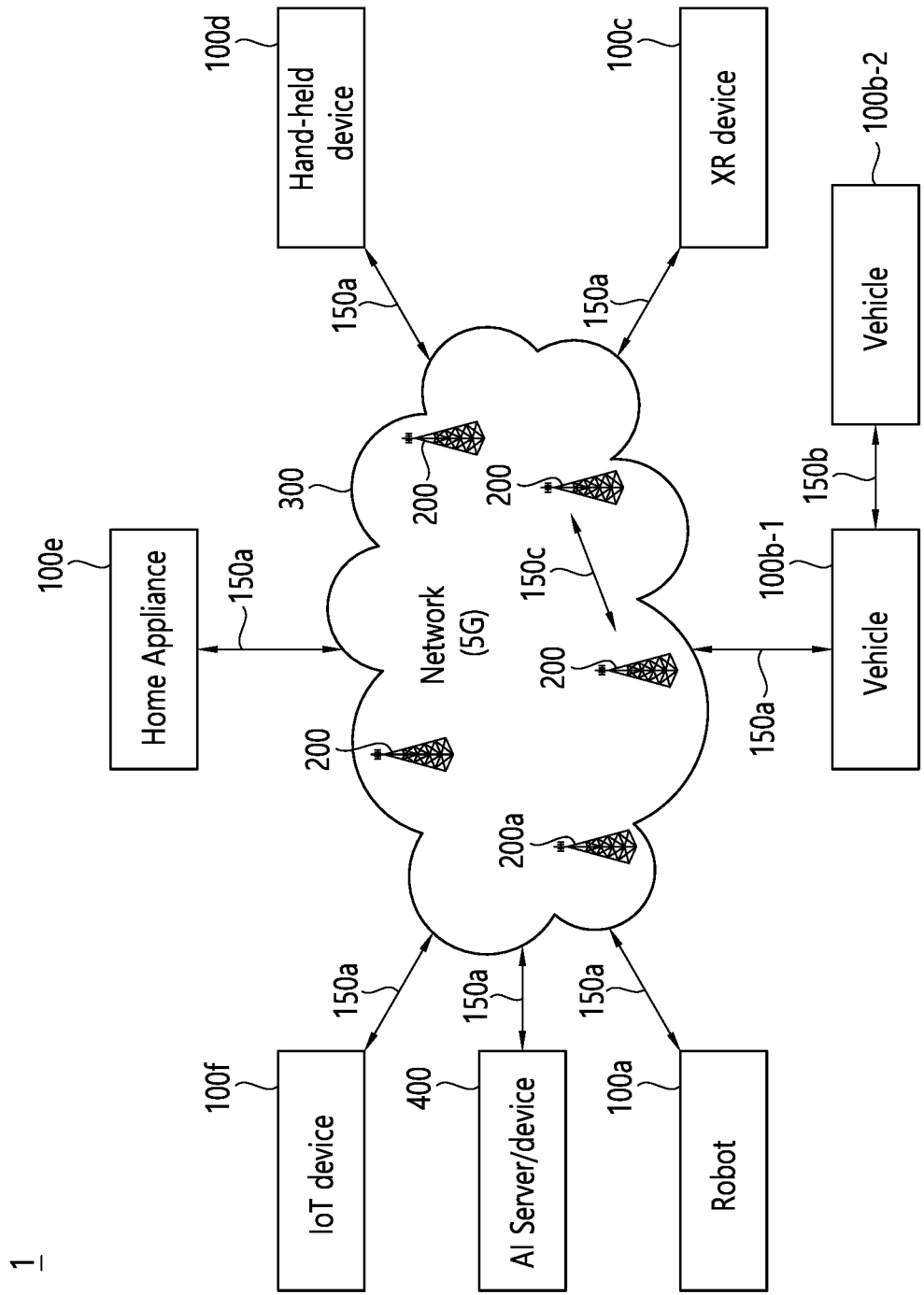
FIG. 29 illustrates a communication system 1 applied to the disclosure.

FIG. 29 illustrates a communication system 1 applied to the disclosure.

Referring to FIG. 29, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 30:
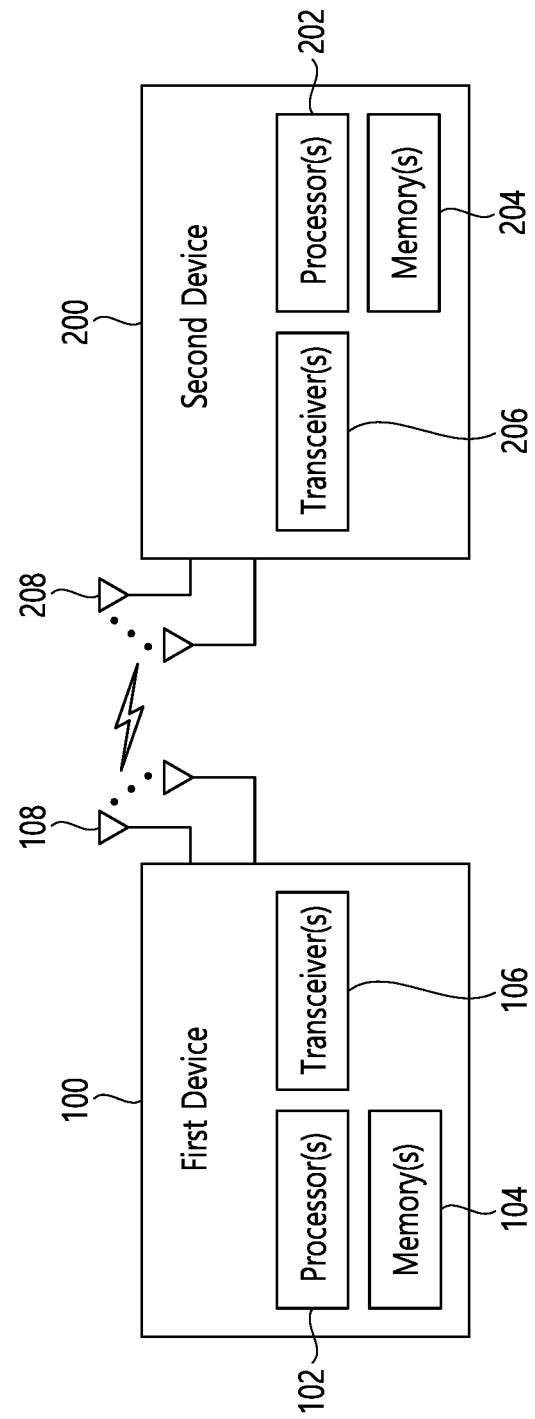
FIG. 30 illustrates a wireless device that is applicable to the disclosure.

FIG. 30 illustrates a wireless device that is applicable to the disclosure.

Referring to FIG. 30, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 29 and/or may respectively correspond to a wireless device 100x and a wireless device 100x of FIG. 29.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 31:
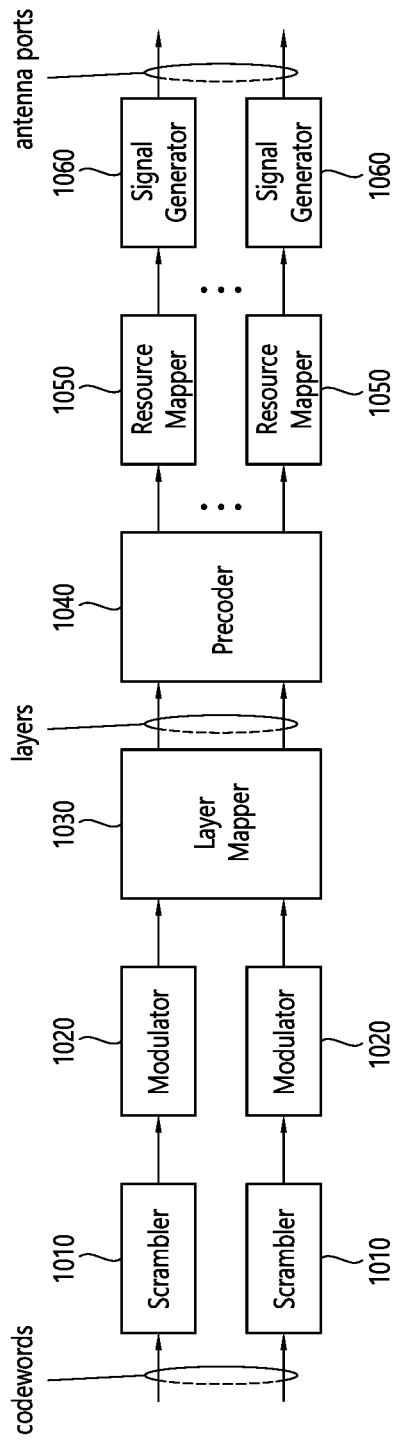
FIG. 31 illustrates a signal processing circuit for a transmission signal.

FIG. 31 illustrates a signal processing circuit for a transmission signal.

Referring to FIG. 31, the signal processing circuit 1000 may include a scrambler 1010, a modulator 1020, a layer mapper 1030, a precoder 1040, a resource mapper 1050, and a signal generator 1060. Operations/functions illustrated with reference to FIG. 31 may be performed, but not limited to, in the processor 102 and 202 and/or the transceiver 106 and 206 of FIG. 30. Hardware elements illustrated in FIG. 31 may be configured in the processor 102 and 202 and/or the transceiver 106 and 206 of FIG. 30. For example, blocks 1010 to 1060 may be configured in the processor 102 and 202 of FIG. 30. Alternatively, blocks 1010 to 1050 may be configured in the processor 102 and 202 of FIG. 30, and a block 1060 may be configured in the transceiver 106 and 206 of FIG. 30.

A codeword may be converted into a radio signal via the signal processing circuit 1000 of FIG. 31. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 31. For example, a wireless device (e.g., 100 and 200 of FIG. 30) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 32:
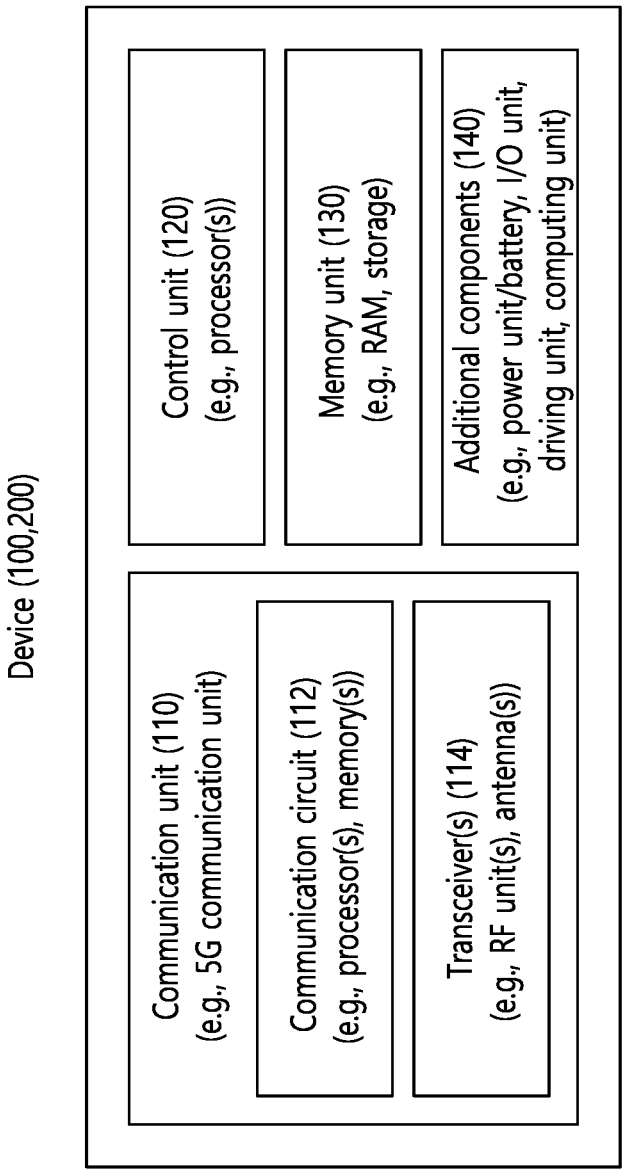
FIG. 32 illustrates another example of a wireless device applied to the disclosure.

FIG. 32 illustrates another example of a wireless device applied to the disclosure. The wireless device may be configured in various forms depending on usage/service.

Referring to FIG. 32, the wireless devices 100 and 200 may correspond to the wireless device 100 and 200 of FIG. 30 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 30. For example, the transceiver(s) 114 may include the at least one transceiver 106 and 206 and/or the at least one antenna 108 and 208 of FIG. 30. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 29), a vehicle (100b-1 or 100b-2 in FIG. 29), an XR device (100c in FIG. 29), a hand-held device (100d in FIG. 29), a home appliance (100e in FIG. 29), an IoT device (100f in FIG. 29), a terminal for digital broadcasting, a hologram device, a public safety device, an MTC device, a medical device, a fintech device (or financial device), a security device, a climate/environmental device, an AI server/device (400 in FIG. 29), a base station (200 in FIG. 29), a network node, or the like. The wireless device may be mobile or may be used in a fixed place depending on usage/service.

In FIG. 32, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 32 is described in detail with reference to the accompanying drawing.

Figure 33:
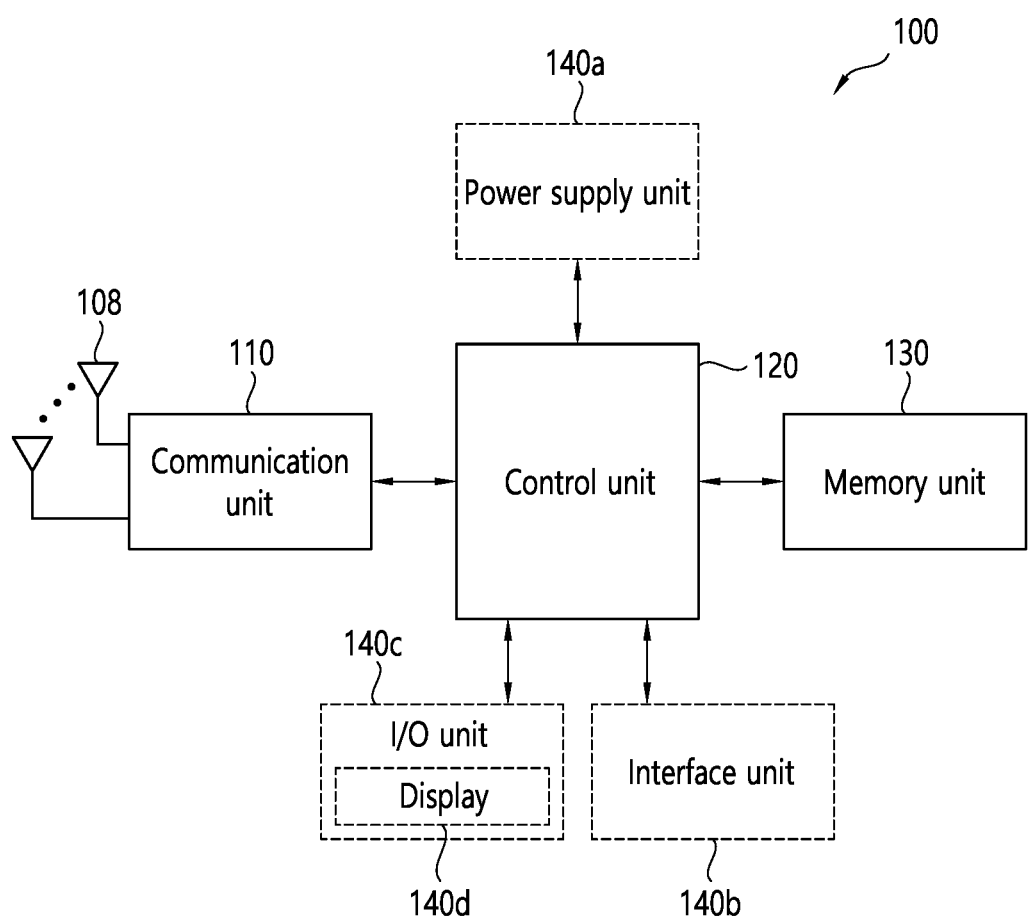
FIG. 33 illustrates a hand-held device applied to the disclosure.

FIG. 33 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 33, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 32, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 34:
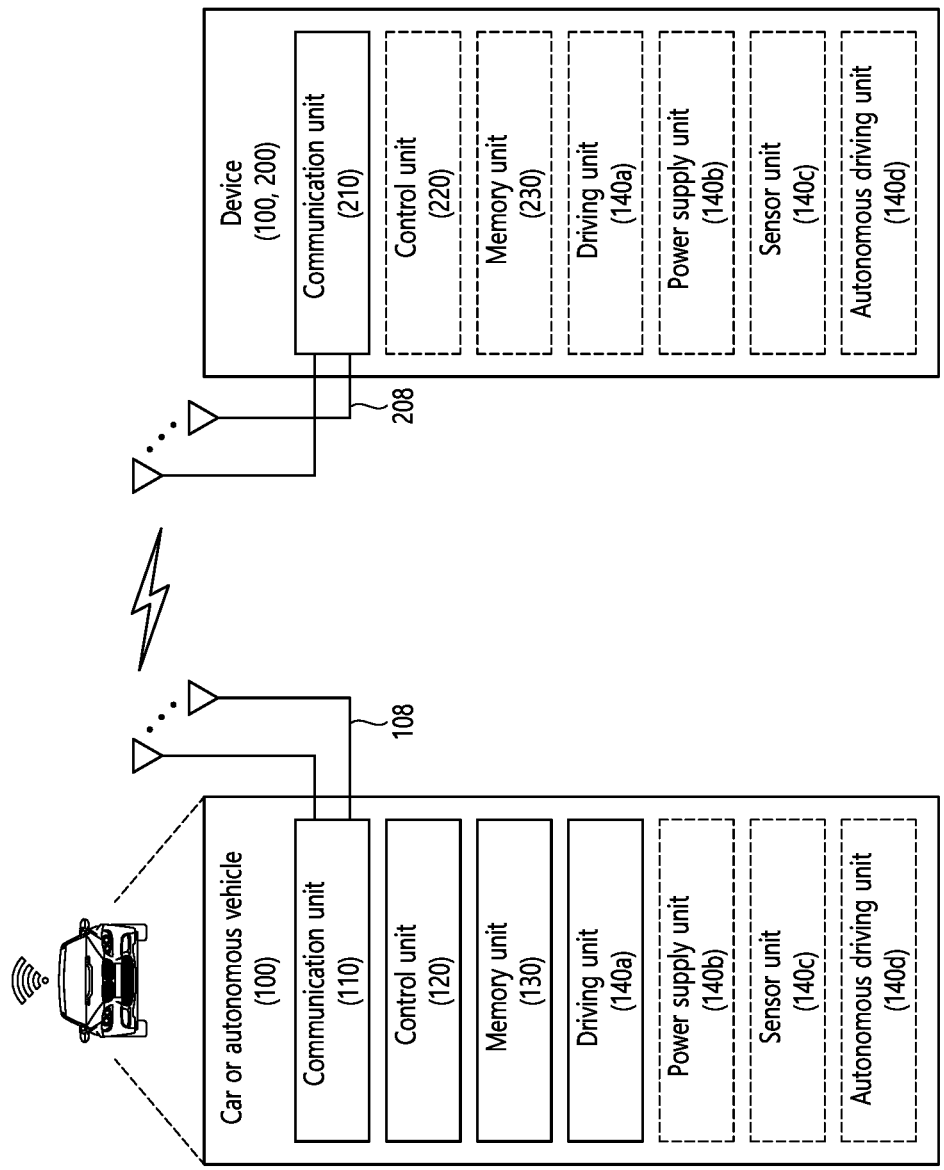
FIG. 34 illustrates a vehicle or an autonomous driving vehicle applied to the disclosure.

FIG. 34 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 34, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 32, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehiclular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 35:
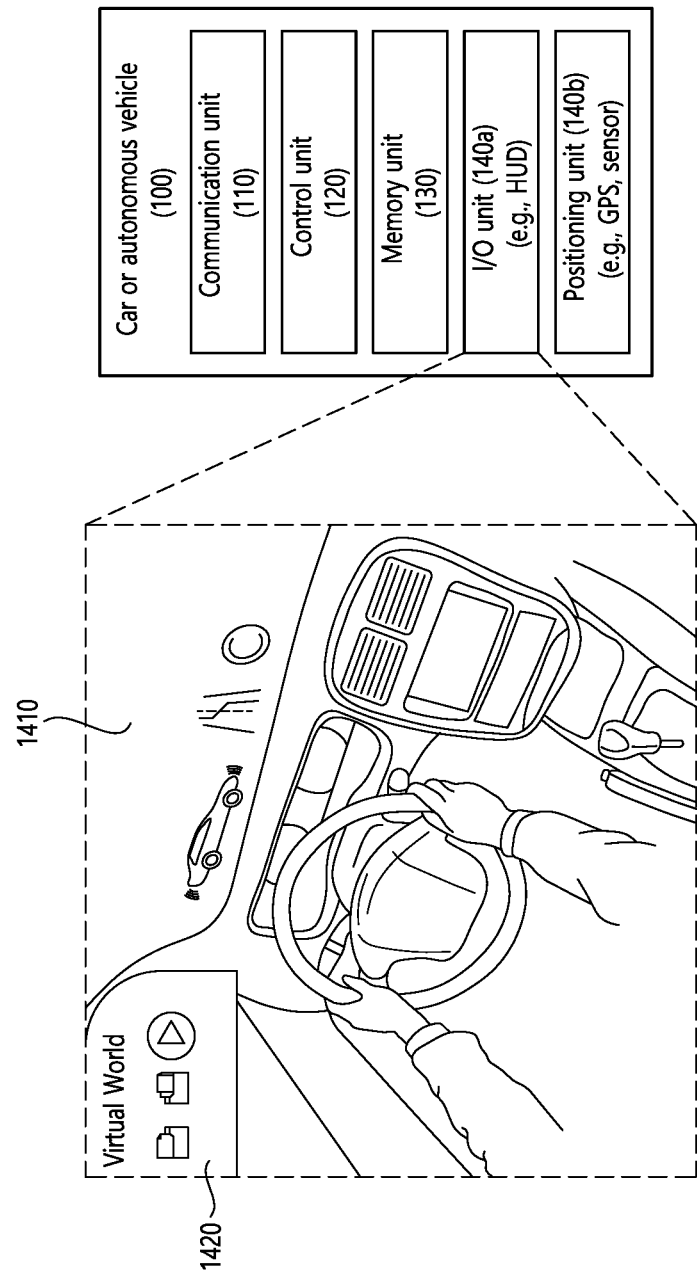
FIG. 35 illustrates a vehicle applied to the disclosure.

FIG. 35 illustrates a vehicle applied to the disclosure. The vehicle may be implemented as a means of transportation, a train, an air vehicle, a ship, and the like.

Referring to FIG. 35, the vehicle 100 may include a communication unit 110, a control unit 120, a memory unit 130, an input/output unit 140*a*, and a positioning unit 140*b*. Herein, blocks 110 to 130/140*a* to 140*b* correspond to block 110 to 130/140 of FIG. 32, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The positioning unit 140*b* may acquire position information of the vehicle 100. The location information may include absolute location information of the vehicle 100, location information within a driving line, acceleration information, location information with a neighboring vehicle, and the like. The positioning unit 140*b* may include a GPS and various sensors.

For example, the communication unit 110 of the vehicle 100 may receive map information, traffic information, and the like from an external server and store it in the memory unit 130. The positioning unit 140*b* may obtain vehicle position information through GPS and various sensors and store it in the memory unit 130. The control unit 120 may generate a virtual object based on map information, traffic information, vehicle location information, and the like, and the input/output unit 140*a* may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140*a*. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 36:
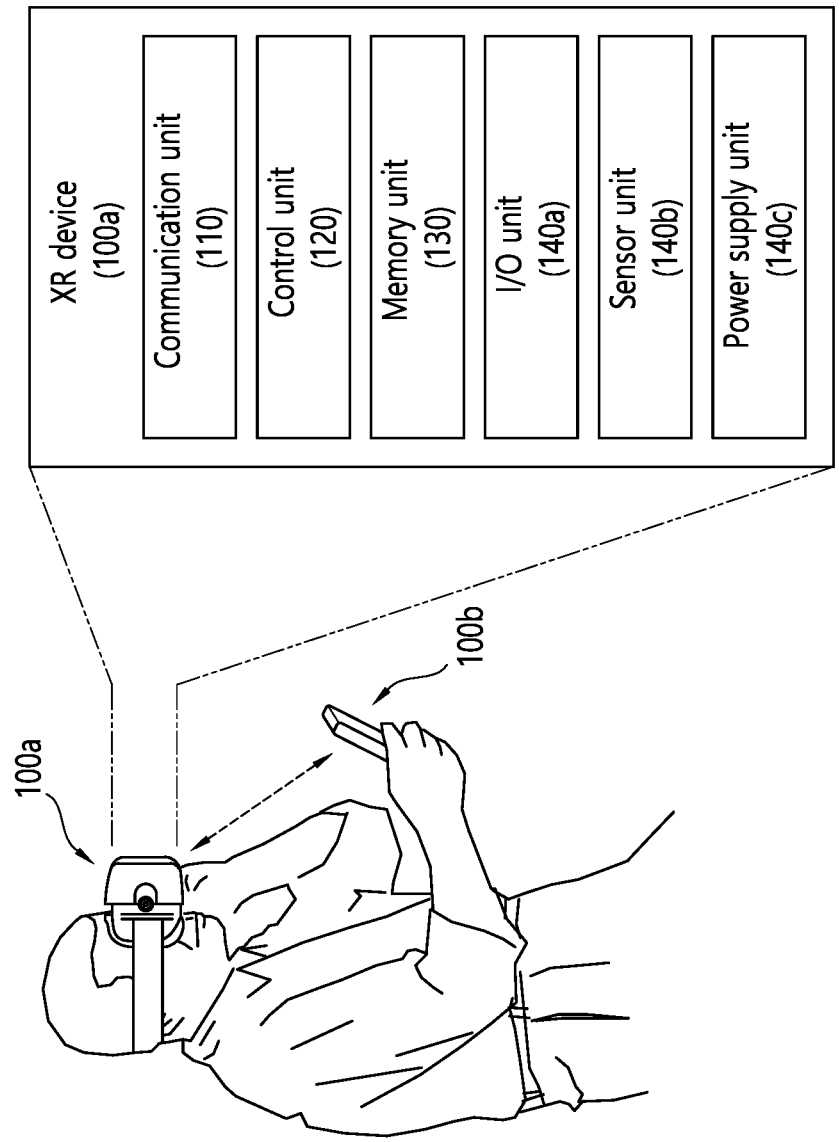
FIG. 36 illustrates a XR device applied to the disclosure.

FIG. 36 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 36, the XR device 100*a* may include a communication unit 110, a control unit 120, a memory unit 130, an input/output unit 140*a*, a sensor unit 140*b* and a power supply unit 140*c*. Herein, blocks 110 to 130/140*a* to 140*c* correspond to blocks 110 to 130/140 in FIG. 32.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100*a* to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100*a*/creating an XR object. The input/output unit 140*a* may obtain control information, data, and the like from the outside, and may output the generated XR object. The input/output unit 140*a* may include a camera, a microphone, a user input unit, a display unit, a speaker, and/or a haptic module. The sensor unit 140*b* may obtain an XR device state, surrounding environment information, user information, and the like. The sensor unit 140*b* may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140*c* supplies power to the XR device 100*a*, and may include a wired/wireless charging circuit, a battery, and the like.

For example, the memory unit 130 of the XR device 100*a* may include information (e.g., data, etc.) necessary for generating an XR object (e.g., AR/VR/MR object). The input/output unit 140*a* may obtain a command to operate the XR device 100*a* from the user, and the control unit 120 may drive the XR device 100*a* according to the user's driving command. For example, when the user wants to watch a movie or news through the XR device 100*a*, the control unit 120 transmits the content request information through the communication unit 130 to another device (e.g., the mobile device 100*b*) or can be sent to the media server. The communication unit 130 may download/stream contents such as movies and news from another device (e.g., the portable device 100*b*) or a media server to the memory unit 130. The control unit 120 controls and/or performs procedures such as video/image acquisition, (video/image) encoding, and metadata generation/processing for the content, and is acquired through the input/output unit 140*a*/the sensor unit 140*b* An XR object can be generated/output based on information about one surrounding space or a real object.

Also, the XR device 100*a* is wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may obtain 3D location information of the portable device 100*b*, and then generate and output an XR object corresponding to the portable device 100*b*.

Figure 37:
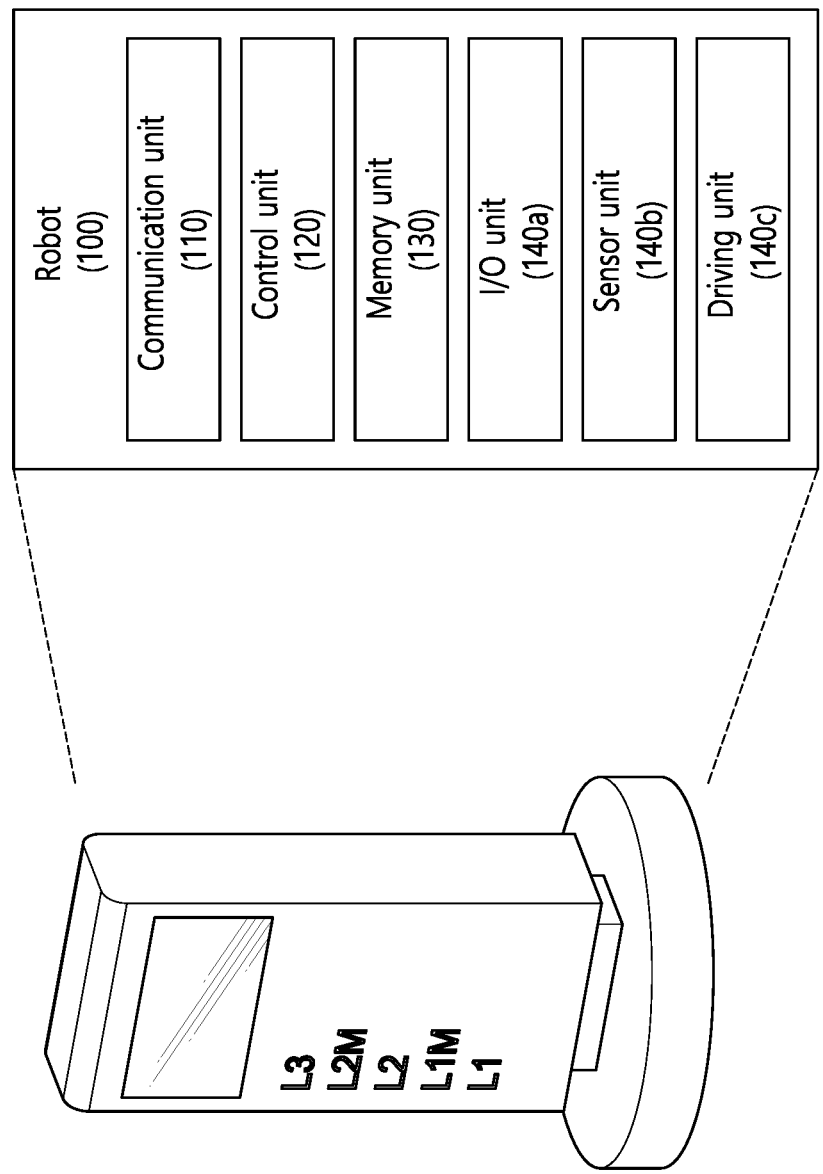
FIG. 37 illustrates a robot applied to the disclosure.

FIG. 37 illustrates a robot applied to the disclosure. The robot may be classified into industrial, medical, home, military, and the like depending on the purpose or field of use.

Referring to FIG. 37, the robot 100 may include a communication unit 110, a control unit 120, a memory unit 130, an input/output unit 140*a*, a sensor unit 140*b*, and a driving unit 140*c*. Herein, blocks 110 to 130/140*a* to 140*c* correspond to blocks 110 to 130/140 in FIG. 32.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140*a* may obtain information from the outside of the robot 100 and may output information to the outside of the robot 100. The input/output unit 140*a* may include a camera, a microphone, an user input unit, a display unit, a speaker, and/or a haptic module, etc. The sensor unit 140*b* may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 38:
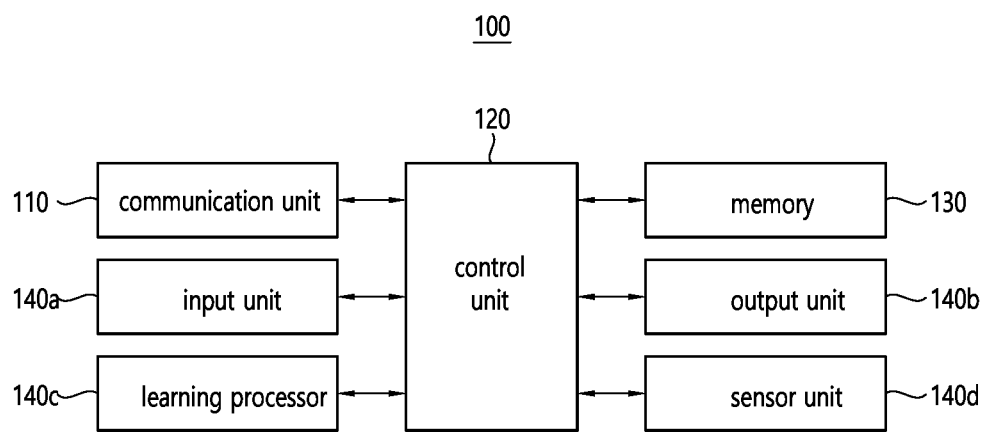
FIG. 38 illustrates an AI device applied to the disclosure.

FIG. 38 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 38, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 32, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 29) or an AI server (e.g., 400 in FIG. 29) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 29). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 29). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method, comprising:
   receiving first availability information by an integrated access and backhaul (IAB) node, wherein the first availability information informs the IAB node of an availability of distribution unit (DU) resources of the IAB node;
   receiving second availability information by the IAB node, wherein the second availability information is applied to a specific child node among a plurality of child nodes connected to the IAB node; and
   setting availability of a specific resource for the specific child node to a not-available resource by the IAB node based on the first availability information and the second availability information,
   wherein each of the plurality of child nodes is an access user equipment (UE) or another IAB node,
   wherein the first availability information is commonly applied to the plurality of child nodes, and
   wherein the specific resource is at least one of a hard resource and a soft resource included in the DU resources.

2. The method of claim 1, wherein the DU resources are used for communication between the IAB node and the plurality of child nodes.

3. The method of claim 1, wherein the hard resource is a resource always available to the IAB node for the plurality of child nodes, the soft resource is a resource whose availability is explicitly or implicitly controlled, and the not-available resource is a resource that is not available to the IAB node for the plurality of child nodes.

4. The method of claim 1, wherein the second availability information is transmitted to the IAB node through F1 application protocol (F1-AP) signaling.

5. The method of claim 1, wherein the second availability information is transmitted from a parent node of the IAB node to the IAB node through a medium access control-control element (MAC-CE) or downlink control information.

6. The method of claim 1, wherein the IAB node sets the availability of the specific resource to a not-available resource based on a symbol unit, a slot unit, or a resource unit having the same resource direction type in one slot.

7. The method of claim 1, wherein the second availability information informs that the availability of the specific resource is not changed for the plurality of child nodes except for the specific child node.

8. The method of claim 1, wherein the IAB node receives third availability information,
   wherein the IAB node resets the availability of the specific resource based on the third availability information.

9. The method of claim 8, wherein the availability of the specific resource is reset to the hard resource or the soft resource by the third availability information based on the availability of the specific resource being set to a not-available resource by the second availability information.

10. The method of claim 1, wherein the IAB node determines mobile termination (MT) resources for performing communication between the IAB node and a parent node of the IAB node based on the first availability information and the second availability information method.

11. The method of claim 10, wherein the specific resource is excluded from the MT resources based on the specific child node being a part of the plurality of child nodes.

12. The method of claim 10, wherein a hard resource included in the DU resources is excluded from the MT resources based on the first availability information.

13. The method of claim 1, wherein the IAB node is a base station.

14. An integrated access and backhaul (IAB) node comprising:
- at least one memory storing instructions;
- at least one transceiver; and
- at least one processor operably connectable to the at least one transceiver and the at least one memory,
- wherein the at least one memory stores instructions that, based on being executed by the at least one processor, cause the at least one processor to perform operations comprising:
- receiving first availability information, wherein the first availability information informs the LAB node of an availability of distribution unit (DU) resources of the IAB node;
- receiving second availability information, wherein the second availability information is applied to a specific child node among a plurality of child nodes connected to the IAB node; and
- setting availability of a specific resource for the specific child node to a not-available resource based on the first availability information and the second availability information,
- wherein each of the plurality of child nodes is an access user equipment (UE) or another IAB node,
- wherein the first availability information is commonly applied to the plurality of child nodes, and
- wherein the specific resource is at least one of a hard resource and a soft resource included in the DU resources.

15. An apparatus configured to control an integrated access and backhaul (IAB) node, the apparatus comprising:
- at least one memory storing instructions; and
- at least one processor operably connectable to the at least one memory,
- wherein the at least one memory stores instructions that, based on being executed by the at least one processor, cause the at least one processor to perform operations comprising:
- receiving first availability information, wherein the first availability information informs the IAB node of an availability of distribution unit (DU) resources of the IAB node;
- receiving second availability information, wherein the second availability information is applied to a specific child node among a plurality of child nodes connected to the IAB node; and
- setting availability of a specific resource for the specific child node to a not-available resource based on the first availability information and the second availability information,
- wherein each of the plurality of child nodes is an access user equipment (UE) or another IAB node, the first availability information is commonly applied to the plurality of child nodes, and the specific resource is at least one of a hard resource and a soft resource included in the DU resources.

\* \* \* \* \*